United States Patent
Hamm et al.

(10) Patent No.: US 12,312,085 B2
(45) Date of Patent: May 27, 2025

(54) MECHANICAL RELEASE DEVICE FOR UNMANNED AERIAL VEHICLE DROP-PAYLOAD

(71) Applicant: Performance Drone Works LLC, Huntsville, AL (US)

(72) Inventors: Dylan Thomas Hamm, Boise, ID (US); Adam Daigler Wetzel, Huntsville, AL (US); Florent Arnoux, Huntsville, AL (US); Taylor Reed Schoonover, Cologne, MN (US); Matthew A. Hernandez, Madison, AL (US)

(73) Assignee: Performance Drone Works LLC, Huntsville, AL (US)

( * ) Notice: Subject to any disclaimer, the term of this patent is extended or adjusted under 35 U.S.C. 154(b) by 106 days.

(21) Appl. No.: 18/319,725

(22) Filed: May 18, 2023

(65) Prior Publication Data
US 2024/0383603 A1 Nov. 21, 2024

(51) Int. Cl.
*B64D 1/02* (2006.01)
*B64U 10/14* (2023.01)
*B64U 101/32* (2023.01)
*B64U 101/60* (2023.01)
*G08C 19/00* (2006.01)

(52) U.S. Cl.
CPC .............. *B64D 1/02* (2013.01); *B64U 10/14* (2023.01); *G08C 19/00* (2013.01); *B64U 2101/32* (2023.01); *B64U 2101/60* (2023.01); *B64U 2201/20* (2023.01)

(58) Field of Classification Search
CPC ............ B64U 2101/60; B64U 2101/64; B64U 2101/66; B64U 2101/67; B64U 2101/69; B64D 1/22
See application file for complete search history.

(56) References Cited

U.S. PATENT DOCUMENTS

| | | | | |
|---|---|---|---|---|
| 4,267,987 A | * | 5/1981 | McDonnell | ............ B64D 39/00 244/6 |
| 5,573,367 A | * | 11/1996 | Erickson | ................... B65F 1/14 414/498 |
| 6,176,167 B1 | * | 1/2001 | Sanderson | ............... B64D 1/06 89/37.16 |

(Continued)

FOREIGN PATENT DOCUMENTS

KR 20230029252 A 3/2023

OTHER PUBLICATIONS

KR 200354662 Y1. ìi ¤i± (Year: 2004).*
(Continued)

*Primary Examiner* — Joshua J Michener
*Assistant Examiner* — Michael B. Kreiner
(74) *Attorney, Agent, or Firm* — Pearl Cohen Zedek Latzer Baratz LLP

(57) ABSTRACT

An Unmanned Aerial Vehicle (UAV) mechanical release device includes a quick-release UAV-attachment mechanism to attach the UAV mechanical release device to a UAV and a payload latch mechanism to secure and release a drop-payload from the UAV mechanical release device. A latch actuator is connected to the payload latch mechanism to move the payload latch mechanism between a closed position and an open position to release the drop-payload.

17 Claims, 20 Drawing Sheets

(56) References Cited

U.S. PATENT DOCUMENTS

| | | | | |
|---|---|---|---|---|
| 6,896,448 | B1* | 5/2005 | White | E02D 7/18 |
| | | | | 405/249 |
| 7,399,019 | B2* | 7/2008 | Malmgren | B66C 1/663 |
| | | | | 294/81.53 |
| 8,840,355 | B1* | 9/2014 | Kulesha | B66F 19/00 |
| | | | | 414/626 |
| 8,905,452 | B2* | 12/2014 | Williams | B25B 1/06 |
| | | | | 294/207 |
| 9,650,136 | B1 | 5/2017 | Haskin et al. | |
| 9,688,404 | B1* | 6/2017 | Buchmueller | G05D 1/00 |
| 9,790,716 | B2* | 10/2017 | Hagemeyer | E05B 65/0858 |
| 9,849,981 | B1* | 12/2017 | Burgess | B64D 1/22 |
| 9,868,526 | B2 | 1/2018 | Yates | |
| 9,915,956 | B2* | 3/2018 | Bokeno | G05D 1/102 |
| 9,928,749 | B2* | 3/2018 | Gil | B60P 3/11 |
| 10,336,453 | B2* | 7/2019 | Chan | B64D 9/003 |
| 10,730,626 | B2* | 8/2020 | Gil | H04W 4/70 |
| 10,814,983 | B2* | 10/2020 | Feldman | B64D 1/22 |
| 10,899,449 | B2* | 1/2021 | Luckay | B60R 11/00 |
| 11,104,438 | B2 | 8/2021 | Prager et al. | |
| 11,292,140 | B2* | 4/2022 | Motowaki | B25J 15/026 |
| 11,447,248 | B2* | 9/2022 | Weekes | B64U 10/20 |
| 11,794,931 | B2* | 10/2023 | Gil | B64U 30/14 |
| 11,884,391 | B2* | 1/2024 | Owen | B64U 10/20 |
| 11,926,418 | B2* | 3/2024 | Lu | B64U 10/00 |
| 11,999,478 | B2* | 6/2024 | Lee | B64D 1/22 |
| 12,080,907 | B2* | 9/2024 | Bell | H01M 50/296 |
| 12,103,683 | B1 | 10/2024 | Hamm et al. | |
| 2017/0029099 | A1 | 2/2017 | Chen | |
| 2017/0210451 | A1 | 7/2017 | Oh | |
| 2018/0022455 | A1 | 1/2018 | McCaslin | |
| 2019/0092468 | A1 | 3/2019 | Deutsch | |
| 2019/0351992 | A1 | 11/2019 | Stock | |
| 2020/0047353 | A1* | 2/2020 | Zheng | B64U 10/13 |
| 2021/0047039 | A1 | 2/2021 | Infante Aguirre et al. | |
| 2022/0267006 | A1 | 8/2022 | Schellaars | |
| 2022/0355931 | A1 | 11/2022 | Schellaars | |
| 2023/0009190 | A1 | 1/2023 | Stevens | |
| 2023/0312145 | A1* | 10/2023 | Scott | B64U 70/92 |
| | | | | 244/137.1 |
| 2023/0373665 | A1* | 11/2023 | Kiyokami | B64U 60/50 |

OTHER PUBLICATIONS

KR 102544943 B1. Shin Kyoung Tae (Year: 2023).*
KR 20210122325 A. Choi Dongmin (Year: 2021).*
KR 20220071612 A. Choi Dongmin (Year: 2022).*
KR 20220139636 A. Bong Jae Hwan (Year: 2022).*
WO 2022154682 A1. Francisco Matos Chaves Bivar De Azevedo (Year: 2022).*
WO 2020139307 A1. Lytvynenko, Andrii (Year: 2019).*
International Search Report & The Written Opinion of the International Searching Authority dated Jul. 29, 2024, International Application No. PCT/US2024/029641.
English Abstract of Korean Publication No. KR20230029252 published Mar. 3, 2023.
Notice of Allowance dated Aug. 6, 2024, U.S. Appl. No. 18/319,738, filed May 18, 2023.

* cited by examiner

MECHANICAL RELEASE DEVICE FOR UNMANNED AERIAL VEHICLE DROP-PAYLOAD

BACKGROUND

Radio controlled unmanned aerial vehicles or UAVs (e.g. drones, such as quadcopters) can move at high speed and make rapid changes in direction when remotely piloted by a skilled user. A drone may include a flight controller that provides output to motors and thus controls propeller speed to change thrust (e.g. in response to commands received from a user via a communication channel such as a Radio Frequency (RF) communication channel established between a user's remote-control and a drone). For example, a quadcopter has four motors, each coupled to a corresponding propeller above the motor, with propellers mounted to generate thrust substantially in parallel (e.g. their axes of rotation may be substantially parallel). The flight controller may change the speeds of the motors to change the orientation and velocity of the drone and the propellers may remain in a fixed orientation with respect to the chassis of the quadcopter (i.e. without changing the angle of thrust with respect to the quadcopter) and may have fixed-pitch (i.e. propeller pitch may not be adjustable like a helicopter propeller so that each motor powers a corresponding fixed-pitch propeller in a fixed orientation with respect to a drone chassis).

DETAILED DESCRIPTION

The following presents systems and methods associated with UAVs or drones. In an example, a UAV may be easily adapted to carry a payload that can be dropped in response to a command (e.g., from a remote control device). A Mechanical Release Device (MRD) may be connected to the UAV (e.g., using a quick-release mechanism) and may include one or more payload latch mechanisms to hold one or more drop-payloads. A payload latch mechanism may include arms that operate in tandem to engage/disengage lugs of a drop-payload. Arms may be driven by a circular gear, which is linked to a latch actuator (e.g., a servo motor). The MRD may include an electronic system including control circuits to control the latch actuator and communicate with a UAV (and remote control device). The MRD may also include sensors (e.g., cameras and/or a rangefinder).

A drop-payload may include a drop-plate that has lugs configured to be held by latch mechanisms of an MRD. The drop-plate may include a frame, with lugs attached at predetermined locations according to locations of engagement features of the MRD. Lugs may be configurable between an unfolded configuration (e.g., perpendicular to the frame), which allows engagement by latch mechanisms, and a folded configuration, which provides a compact arrangement for transport and storage.

Aspects of the present technology may be implemented using a wide range of UAVs including, but not limited to drones (e.g. quadcopter drones). Such drones may be controlled by a user using a remote control device and/or may be controlled with little or no human input (e.g. using an autopilot to fly a predetermined flightpath and/or using Artificial Intelligence (AI) or other technology for autonomous flight).

Although the following description is primarily given the context of drones (e.g. quadcopters) moving along a three-dimensional flightpath, certain concepts presented can be applied more generally. For example, the systems and techniques can be applied to non-drone aircraft and/or ground-based vehicles, watercraft and the like.

Figure 1:
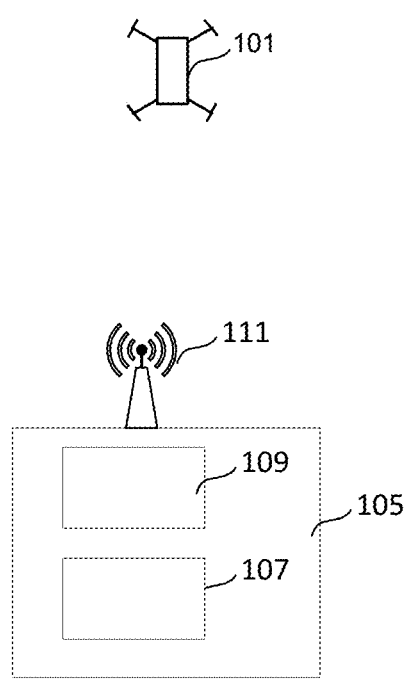
FIG. 1 is an example of a UAV and remote control.

FIG. 1 shows an example of a UAV 101, which is controlled by remote control 105 in this example. Remote control 105 includes a user input interface 107 (e.g. one or more joysticks, buttons, touchpads, touchscreens, keyboards, or other input device(s) configured to receive a user's input). User input interface 107 allows a user to provide appropriate input to control UAV 101 (e.g. by using joysticks to control direction and speed of UAV). Remote control 105 also includes a user output interface 109 (e.g. one or more visual displays, lights, indicators, speakers, or other output devices configured to provide output to a user). For example, a display may show one or more views from camera(s) located on UAV 101 (e.g. a camera providing a pilot's view from UAV 101 to allow FPV operation of UAV 101). In some examples, a UAV may be configured for autonomous operation so that some or all piloting is performed autonomously (e.g. without input from a remote control such as remote control 105). For example, UAV 101 may include a Global Positioning System (GPS) module to determine position or enable independent navigation and/or one or more cameras (e.g. cameras that are paired to form stereoscopic cameras) that may allow UAV 101 to locate features in its environment for navigation.

Figure 2:
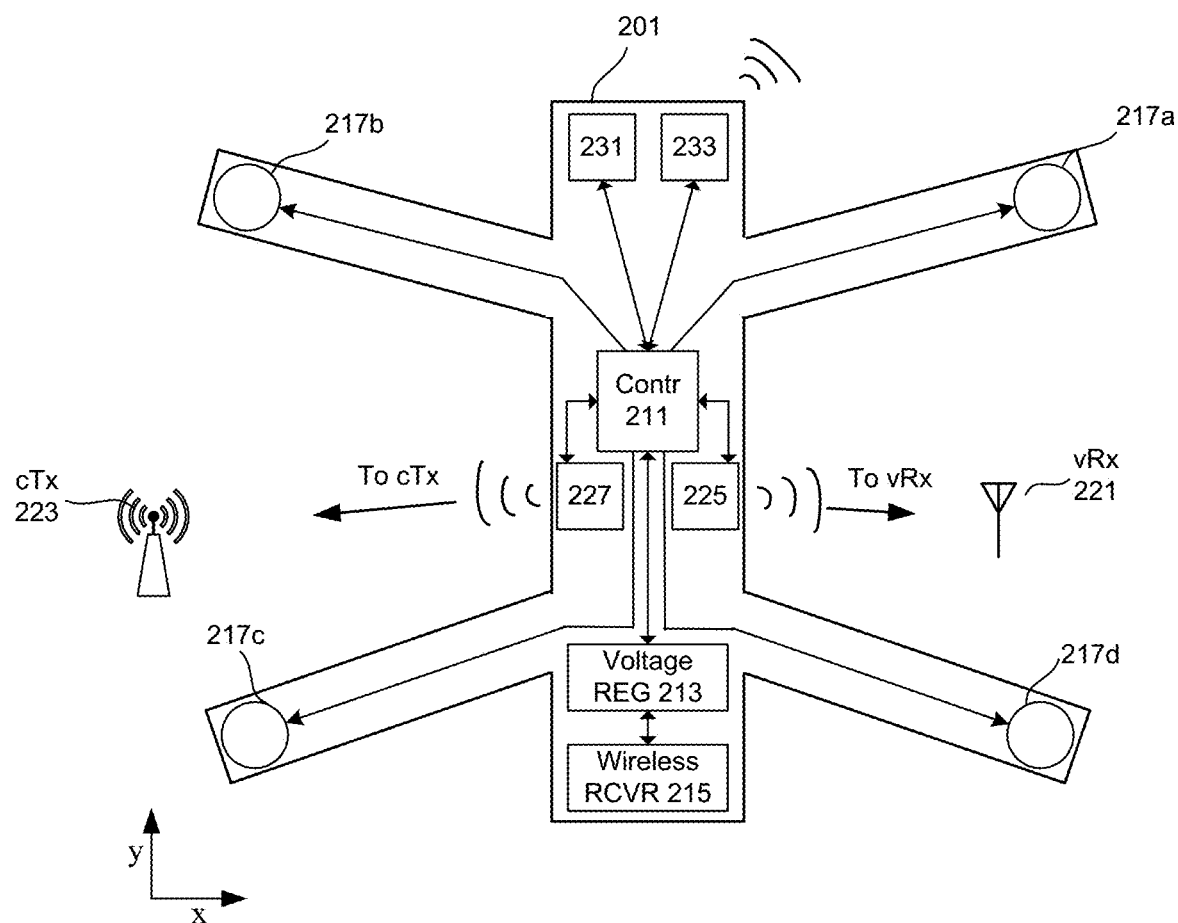
FIG. 2 is a simplified representation of some of the components for one embodiment of a UAV (quadcopter).

FIG. 2 is simplified representation of some of the components for one example of a UAV 201 (e.g., UAV 101), which is a remote-controlled quadcopter in this example. FIG. 2 shows flight controller 211 connected to motors 217a-d (which turn respective propellers, not shown in this view), the voltage source and regulator 213, wireless receiver 215, video camera 231 and altitude sensor 233, and the transmitters 225 and 227. In this embodiment, extending on an arm from each of the corners of UAV 201 is a motor 217a-d, each of which is controlled by the flight controller 211 to thereby control thrust generated by propellers attached to motors 217a-d. A voltage source (e.g. battery) and regulator 213 supplies power. A pilot's commands are transmitted from control signal transceivers such as cTx 223, received by wireless receiver 215. Control signal transceiver cTx 223 may be in a remote-control operated by a pilot (remote-control user) to fly UAV 201. The flight controller 211 uses power from the voltage source and regulator 213 to drive the motors 217a-d according to the pilot's signals.

UAV 201 also includes video camera 231 and altitude sensor 233 that supply data to the flight controller 211. An FM or other type video transmitter 225 transmits data from the video camera 231 to a video monitor receiver vRx 221 (external to the drone, such as on the ground) that monitors the video signals and passes on the video data to the pilot. Data can also be sent back to the control signal transceiver cTx 223 by the transmitter 227. Although the transmitter 227 and wireless receiver 215 are shown as separate elements in FIG. 2, in many embodiments these will be part of a single transceiver module. And control signal transceiver cTx 223 and video monitor receiver vRx 221 may be part of a single transceiver module. For example, a remote-control, such as remote control 105, may include both a control signal transceiver and a video monitor receiver to allow a remote-control user to see video from video camera 231 while piloting UAV 201.

Figure 3:
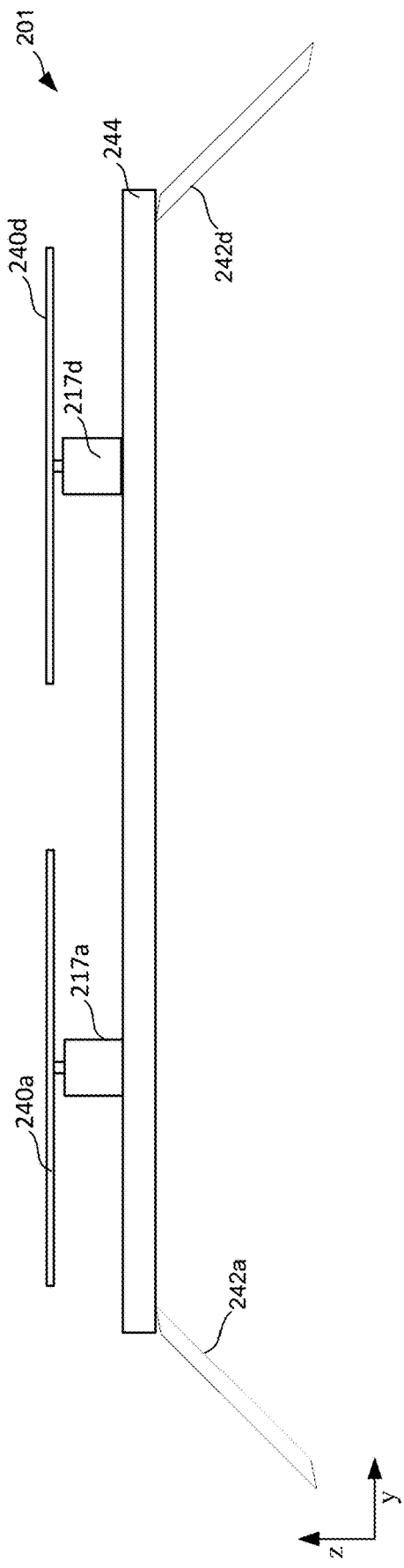
FIG. 3 shows an example of some components of a quadcopter.

FIG. 3 shows a simplified side-view of UAV 770, which includes motors 217a, 217d (two of four motors 217a-d are visible in this view) and attached propellers 240a, 240d. Also shown are legs 242a and 242d (two of four legs are visible in this view) that are attached to the bottom surface of chassis 244 and support chassis 244 when on the ground. Electric motors 217a-d are mounted to the top surface of chassis 244 and drive corresponding propellers.

In some cases, a UAV such as a drone may be used to transport a payload. A payload may be attached to the UAV in various ways.

Figure 4A:
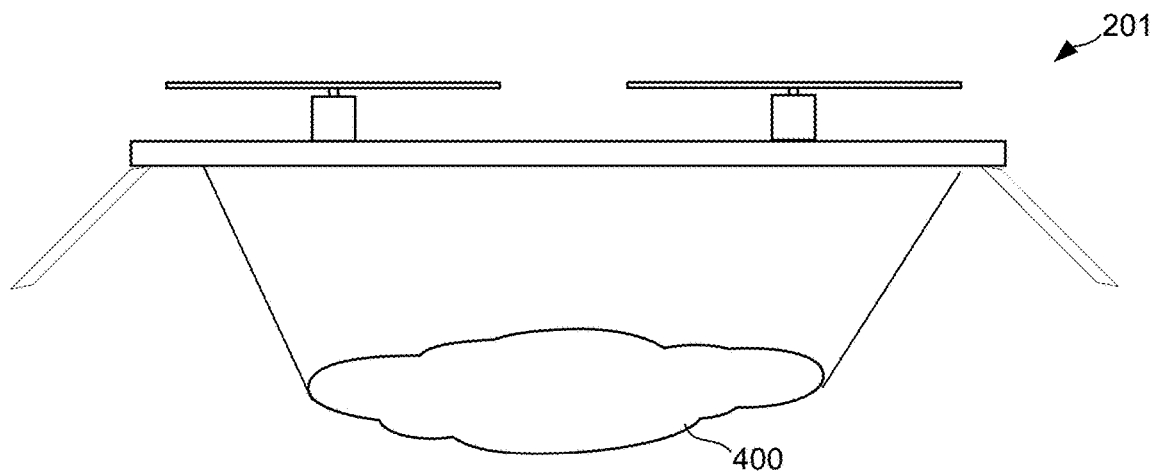
FIGS. 4A-B illustrate UAVs carrying payloads.

FIG. 4A shows an example of a payload 400 that is loosely attached to UAV 201 (e.g., by netting, webbing, ropes, chords, bungee cords, or other material). Such attachment may be performed manually (e.g., using hooks, carabineers, cable ties, knots, or otherwise) using whatever attachment points may be available on exterior surfaces of a UAV. One disadvantage of this arrangement is that a loosely attached payload may cause instability during flight. A loosely attached payload may have a pendulum effect and may make flying a UAV difficult or even cause a UAV to crash.

Figure 4B:
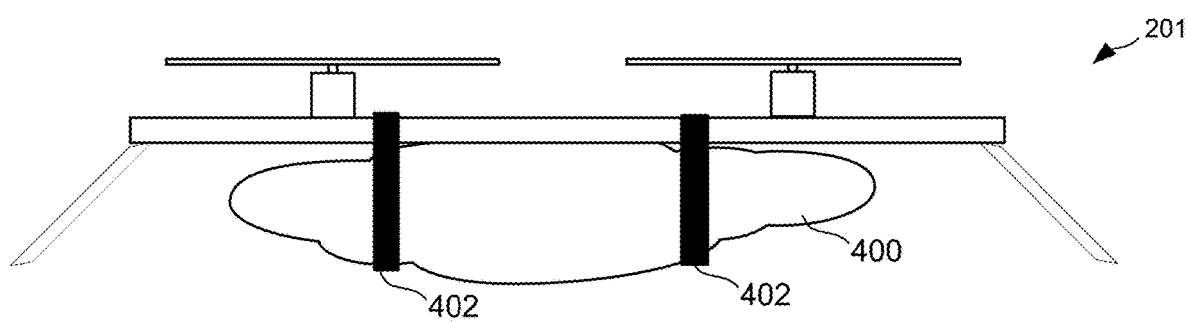

FIG. 4B shows an alternative arrangement in which payload 400 is closely attached to UAV 770. FIG. 4B shows straps 402, which bind payload 400 to UAV 770 and may mitigate or avoid a pendulum effect (alternative attachment components such as cable ties or bungee cord may be used instead of straps).

Attachment of payloads (e.g., as shown in FIGS. 4A-B) may be improvised according to circumstances (e.g., dimensions of UAV and payload, availability of attachment points, materials available, etc.), may require significant time for attachment and subsequent detachment of the payload. In some cases, attachment may not be reliable (especially when performed by untrained individuals) and improper attachment may damage drone components and/or impact flight characteristics.

In some cases, it may be desirable to drop a payload in response to a command from a remote control device (e.g., remote control device 105). Improvised attachment (e.g., as illustrated in FIGS. 4A-B) may not be compatible with remote controlled dropping of a payload because some user intervention is required. While a UAV may be designed for remote controlled dropping of a payload, such a UAV may not always be available, and it may be desirable to adapt UAVs that were not originally designed with such capability. Significant modification and/or customization of a UAV may be required to allow remote controlled dropping of a payload, which may require specialized components and skilled individuals.

Aspects of the present technology are directed to facilitating adaptation of UAVs for transporting a payload and for dropping the payload ("drop-payload") in response to a command (e.g., in response to a command from a remote control).

According to an example, a UAV Mechanical Release Device (MRD) is provided that includes a quick-release UAV-attachment mechanism and a payload latch mechanism to secure and release a drop-payload. A latch actuator (e.g., a motor such as a servo motor) connected to the payload latch mechanism enables movement of the payload latch mechanism between closed and open positions to respectively hold and release the drop-payload. While examples described below refer to a closed position to capture a drop-payload and an open position to release a drop-payload, other positional states may additionally or alternatively be provided to allow capture and release (e.g., more than two discrete positions and/or a range of positions between open and closed positions).

Figure 5A:
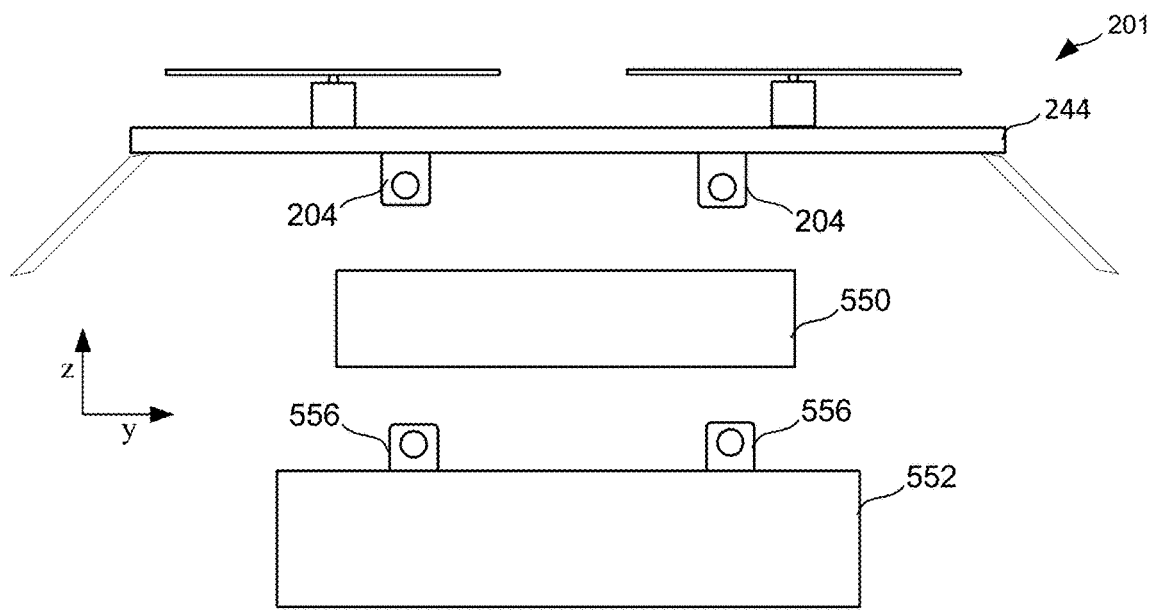
FIGS. 5A-B illustrate an example of a UAV with a Mechanical Release Device (MRD) and drop-payload.

FIG. 5A shows an example of an MRD 550, which is shown between UAV 201 and drop-payload 552 (unattached in this view). Lugs 204 extend from UAV 201. Lugs 204 may be attached (e.g., bolted, welded, riveted or otherwise attached) to UAV 201 (e.g., to a UAV chassis or other component). MRD 550 is configured for attachment to lugs 204 by one or more quick-release mechanisms. Drop-payload 552 includes lugs 556. MRD 550 is configured to hold lugs 556 and thereby hold drop-payload 552 and to release lugs 556 and thereby release drop-payload 552 in response to a command (e.g., from a remote control).

Figure 5B:
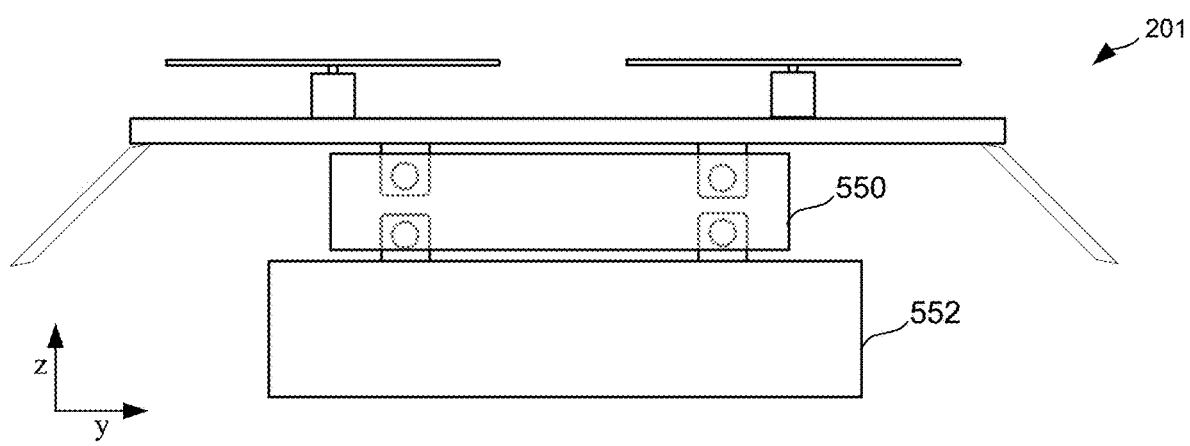

FIG. 5B illustrates MRD 550 attached to UAV 201 and holding drop-payload 552. In this configuration, UAV 201 can fly with drop-payload 552 securely attached. Then, in response to a command, MRD 550 can release drop-payload 552 at a desired location (e.g., while in the air or after landing). Subsequently, UAV 201 (with MRD 550 attached) can continue flying (or take off if it has landed) and continue to another location. In some examples, MRD 550 may pick up a drop-payload without manual intervention (e.g., a UAV may be lowered from a position above a drop-payload, the MRD may engage the drop-payload and then the UAV may take off with the drop-payload secured to the UAV by the MRD). To reconfigure UAV 201 for other operations that do not require remote controlled release of a drop-payload, MRD 550 can simply be detached (e.g., using quick-release attachment features).

Lugs 556 may be positioned for capture by corresponding engagement features of MRD 550. Drop-payload 552 may be a container that is designed to interface with MRD 550 so that lugs 566 are appropriately configured (e.g., shape and locations of lugs correspond to engagement features of the MRD).

In some cases, for example, to accommodate a wide range of drop-payloads, a drop-payload plate or frame may be provided that includes lugs at appropriate locations for capture by an MRD. Such a plate or frame may be compact, lightweight and have a range of attachment points suitable for attaching various drop-payloads without the need for customized containers.

Figure 6A:
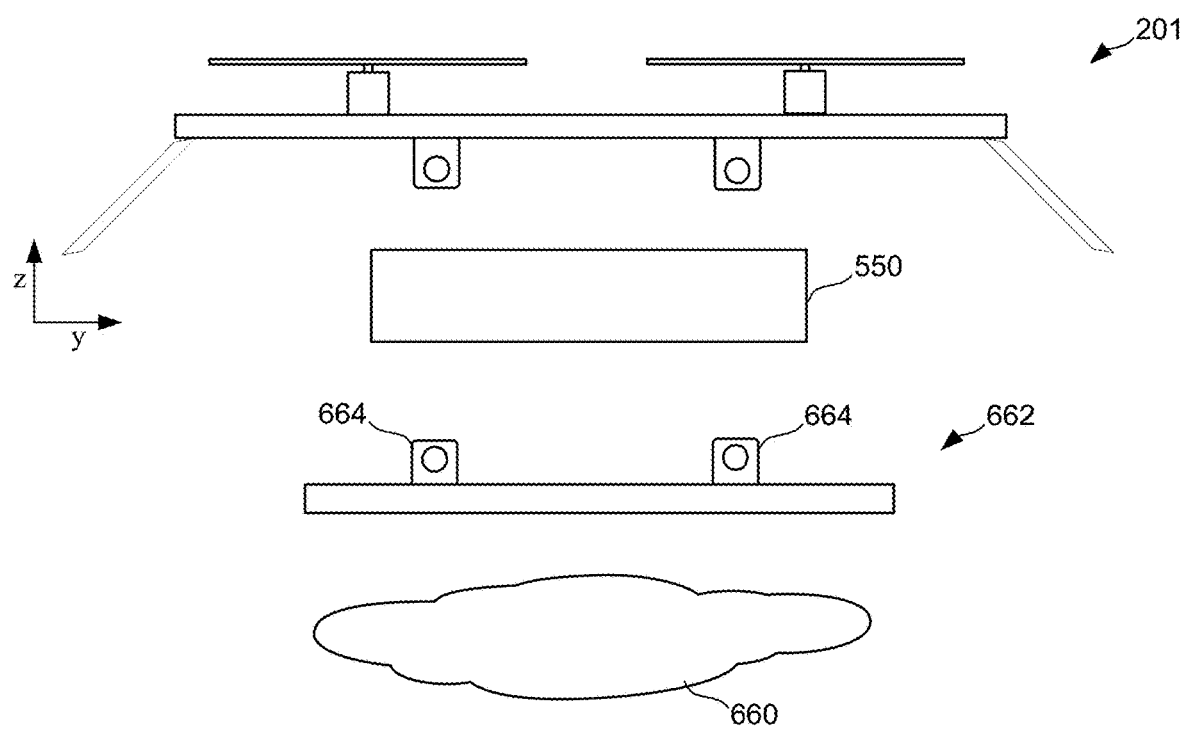
FIG. 6A-C illustrate an example of a UAV with an MRD and drop-payload that includes a drop-plate.

FIG. 6A shows an example of UAV 201, MRD 550, a payload 660 and a drop-plate 662 (all shown separately in an unattached configuration). Drop-plate 662 includes lugs 556, which are arranged at appropriate locations for capture and release by MRD 550. While two lugs 664 are shown in this view, any number of lugs may be provided (e.g., four) according to the configuration of MRD 550.

Figure 6B:
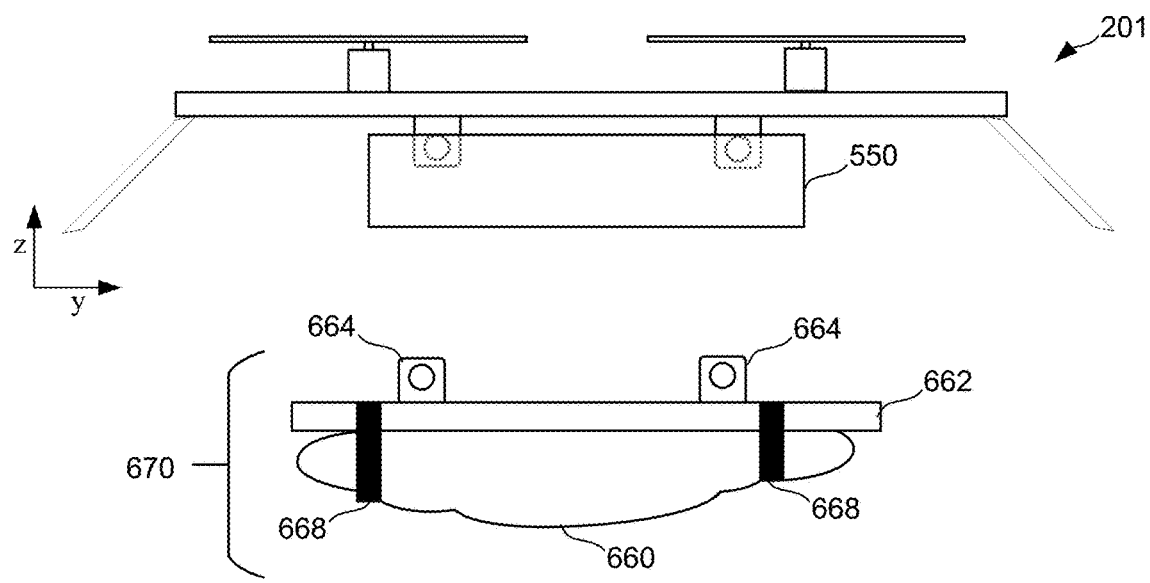

FIG. 6B shows an example of UAV 201, MRD 550, payload 660 and drop-plate 662 with MRD 550 attached to UAV 201 (e.g., by a quick-release mechanism). Payload 660 is attached to drop-plate 662 to form drop-payload 670 (the combination of payload 660 and drop-plate 662 is dropped as a single unit and may be considered a drop-payload). The attachment components used to attach a payload to a drop-plate may depend on the payload. For example, straps, netting, webbing, rope, bungee cord, or other material may be used and may be secured using buckles, hooks, carabineers, cable ties, knots, or otherwise. FIG. 6B shows payload 660 attached to drop-plate 662 by two straps 668, which may be secured with buckles (e.g., quick-release buckles).

Drop-plate 662 may be in the form of a lightweight frame that includes a number of openings between frame members that allow straps, ropes or other attachment components to be looped through and/or attachment of hooks, carabineers or other hardware. Unlike a custom-designed container, such a drop-plate does not limit the physical dimensions of a payload and can accommodate a variety of irregularly sized/shaped payloads. A payload may be prepared by attachment to a drop-plate ahead of time (e.g., without the presence of a UAV) and may then be rapidly attached to a UAV equipped with an MRD. Attachment of a drop-payload (e.g., with a drop-plate) may be performed manually (e.g., lifting the drop-plate to place lugs in the correct locations) or without manual intervention (e.g., lowering a UAV equipped with a MRD down onto a drop-payload with lugs aligned with corresponding features of the MRD and then engaging the lugs with engagement features of the MRD).

Figure 6C:
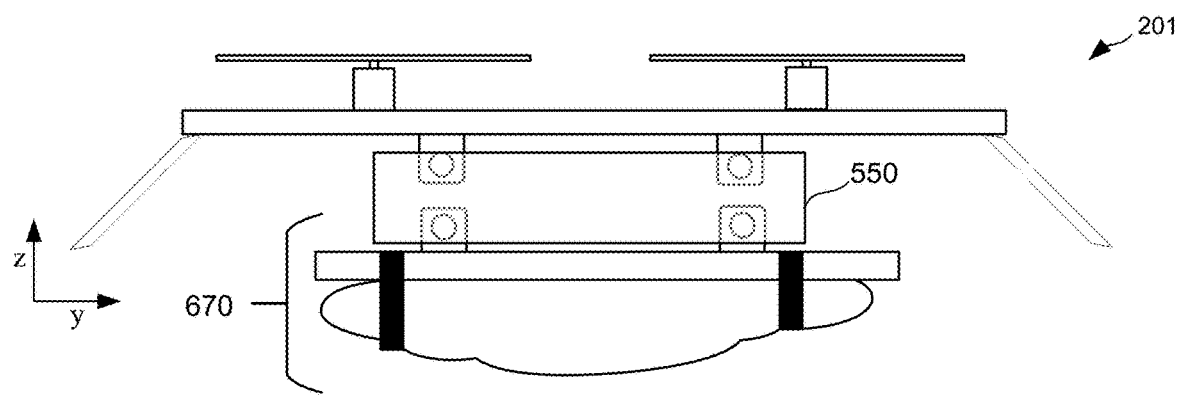

FIG. 6C shows an example of UAV 201 with MRD 550 holding drop-payload 670. UAV 201 may fly with drop-payload 670 securely held in this configuration. Drop-payload 670 may be released by MRD 550 at any time in response to a command. For example, drop-payload 670 may be released while UAV 201 is in the air or after it has landed. A command to release drop-payload 670 may be sent from a remote control (e.g., through communication circuits of UAV 210 or directly to MRD 550).

Figure 7:
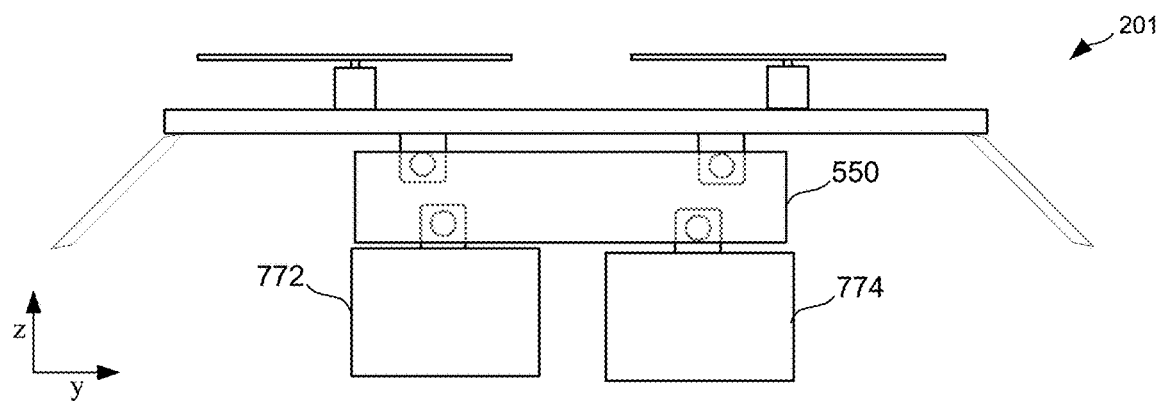
FIG. 7 illustrates an example of a UAV with an MRD and multiple drop-payloads.

While FIGS. 5A-6C show examples that include a UAV and MRD with a single drop-payload, more than one payload may be similarly carried by a UAV using an appropriate MRD. FIG. 7 shows an example of UAV 201 and MRD 550 with first drop-payload 772 and second drop-payload 774. In some cases, an MRD (e.g., MRD 550) may be adaptable to hold varying numbers of drop-payloads. For example, instead of holding one drop-payload that has four lugs, an MRD may hold two smaller drop-payloads that each have two lugs or four smaller drop-payloads that each have a single lug. In examples in which an MRD holds multiple drop-payloads, the payloads may be dropped together or separately depending on the configuration of the MRD and the command received (e.g., a command may specify which drop-payload(s) to drop).

Figure 8:
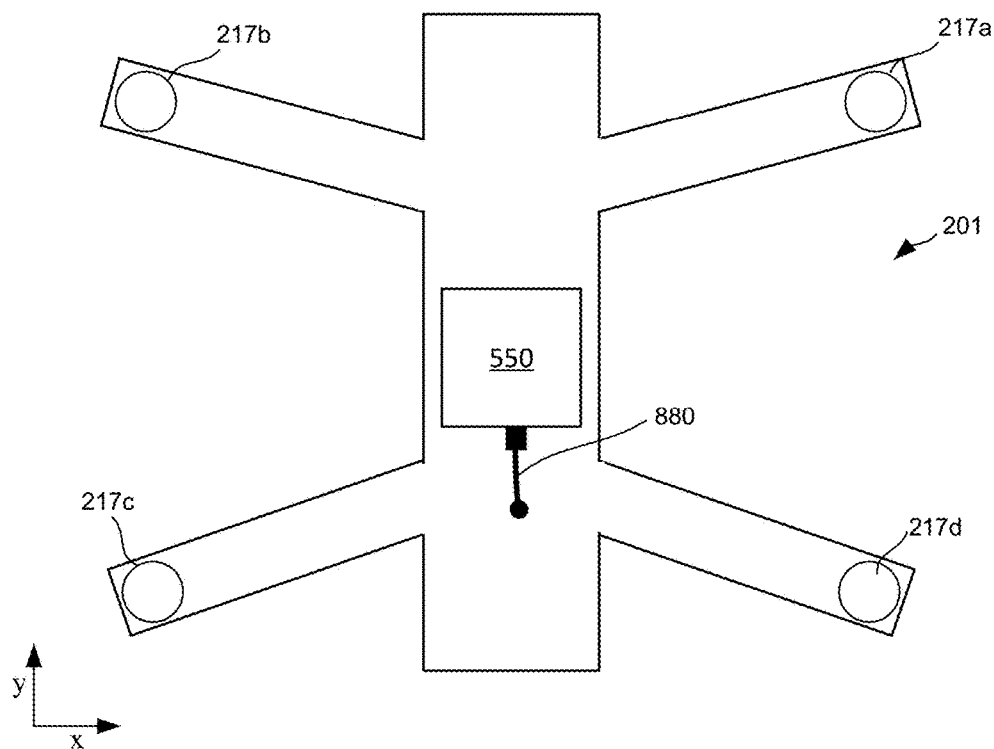
FIG. 8 illustrates an example of a UAV with an MRD.

FIG. 8 shows a view of UAV 201 (e.g., view from below along the z-direction) with MRD 550 attached to its underside. In addition to being mechanically attached to UAV 201 by quick-release attachment features (not shown in this view), MRD 550 is electrically connected to UAV 201 by a cable 880. Cable 880 may provide power from UAV 201 (e.g., from voltage source and regulator 213) to MRD 550. Cable 880 may also provide one or more communication channels for communication between UAV 201 and MRD 550. For example, commands or other communication may be sent from UAV 201 (e.g., from wireless receiver 215 or flight controller 211 to MRD 550). Such commands may be received by communication circuits of UAV 201 (e.g., wireless receiver 215) from a remote control (e.g., remote control 105) and relayed to MRD 550 and/or may be generated by UAV 201.

Figure 9:
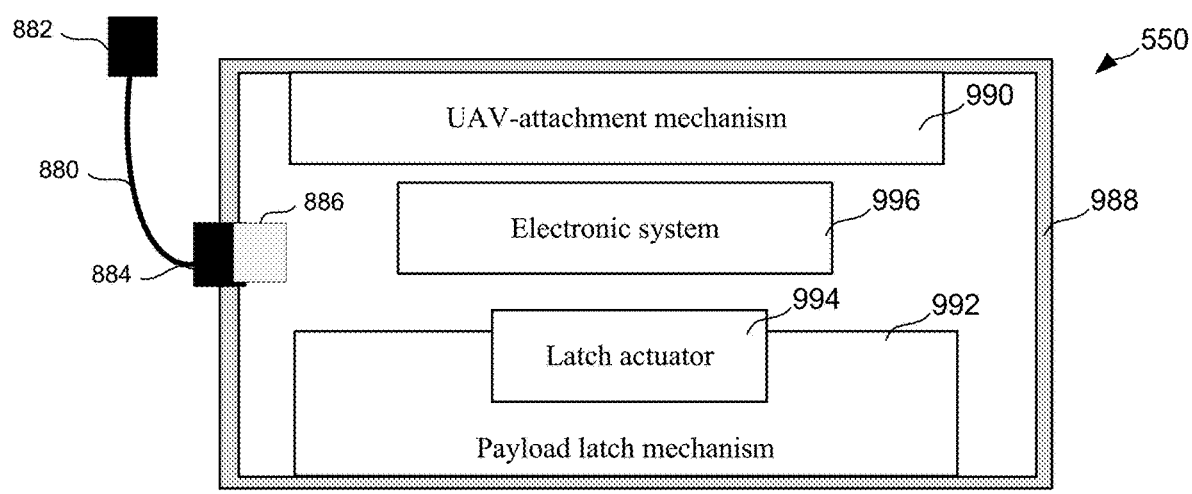
FIG. 9 shows a block diagram of an example of an MRD.

An MRD may be implemented in various ways. FIG. 9 shows a block diagram of certain components of an example implementation of MRD 550. Components are shown as blocks in FIG. 9 for illustration purposes. FIG. 9 is not intended to represent the shapes, locations, or other details of the components shown and is not intended to show all components of an MRD (an MRD may have more or fewer components than those illustrated).

MRD 550 includes cable 880 to connect MRD 550 to a UAV. Cable 880 includes connector 882 to connect to a corresponding connector on a UAV and connector 884 to connect to a corresponding connector 886 on an outer surface of MRD 550.

MRD 550 includes an enclosure 988, which extends about other components to provide protection structural support. Such an enclosure may be substantially sealed (e.g., waterproof) or partially open (e.g., a framework with multiple openings). Openings are provided in enclosure 998 for lugs of a UAV and for lugs of one or more drop-payload.

MRD 550 includes a UAV-attachment mechanism 990 to attach the UAV mechanical release device to a UAV. The UAV-attachment mechanism 990 may be a quick-release mechanism that allows MRD 550 to be rapidly attached and detached. For example, UAV-attachment mechanism 990 may include a plurality of pins (e.g., captured pins) to engage corresponding lugs of the UAV (lugs may have holes to accommodate pins). The captured pins may extend through enclosure 998. Other quick-release mechanisms may also be used.

MRD 550 includes one or more payload latch mechanism 992 to secure and release drop-payload(s). The payload latch mechanism(s) may include one or more engagement features to engage corresponding features of the drop-payload (e.g., to engage lugs of a drop-payload such as lugs 556 and 664). Engagement features may be movable by the latch mechanism between a closed configuration that holds the drop-payload(s) and an open configuration that releases the drop-payload(s).

MRD 550 includes a latch actuator 994 connected to the payload latch mechanism 992 to move payload latch mechanism 992 between the closed and open positions (e.g., to release the drop-payload or to allow insertion of a drop-payload lug when loading a drop-payload). Latch actuator 994 may be an electrical, pneumatic, hydraulic, or other actuator that provides mechanical force to move latch components. An example of a suitable latch actuator is an electric motor (e.g., servo motor, stepper motor, or other electric motor).

MRD 550 includes an electronic system 996, which may include various electronic components. Electronic system 996 may be connected to a UAV by cable 880, which may provide power and communication from the UAV to electronic system 996. Electronic system 996 may also be in communication with components of the UAV through cable 880. Electronic system 996 may include power circuits (e.g., one or more power controller) to receive an incoming power supply and generate suitable outputs for components of MRD 550 (e.g., converting a 24 volt power supply received from a UAV to other voltages used by MRD components). Electronic system 996 may also include control circuits to control components of MRD 550, including, for example, latch actuator 994, which in turn controls opening and closing of payload latch mechanism 992. Control circuits may include one or more processor and one or more memory. For example a processor may operate using software stored in a memory and may be configured by such software. Electronic system 996 may include one or more sensors. For example, the one or more sensors may include one or more cameras, such as an infra-red or thermal camera and/or a visible (EO) camera (camera operating in the range of visible light, approximately 380-700 nm wavelength). The one or more sensors may include a rangefinder (e.g., laser rangefinder), which may be directed downwards to provide an accurate altitude measurement. Some or all sensor data (e.g., image and/or altitude data) may be sent to a UAV through cable 880 and may be sent from the UAV to a remote control or other remote device (e.g., so that a user can determine if the UAV is in the right location to drop the drop-payload). In some cases, image recognition or other logic in electronic system 996 or in a UAV may use data from sensors to identify a location (e.g., drop location) and may respond to identification of a location without an external command (e.g., dropping a drop-payload at a recognized location without a command from a remote control).

While the example of FIG. 9 uses components of the UAV for communication with a remote control (e.g., control unit 105), communication between components of MRD 550 and a remote control may be implemented in various ways using other control components that are not in the UAV. In an example, electronic system 996 of MRD 550 may include circuits for sending data directly to and receiving data (e.g., commands) directly from a remote control (e.g., a transmitter/receiver may be included in electronic system 996). Circuits enabling direct communication with a remote control may be in addition to components enabling communication with a UAV (e.g., cable 880) or may be instead of such components (e.g., MRD 550 may not have any communication with the UAV to which it is attached). Cable 880 may simply provide power (not communication) in this arrangement or MRD 550 may include a battery for power so that no cable connects MRD 550 to the UAV.

Figure 10A:
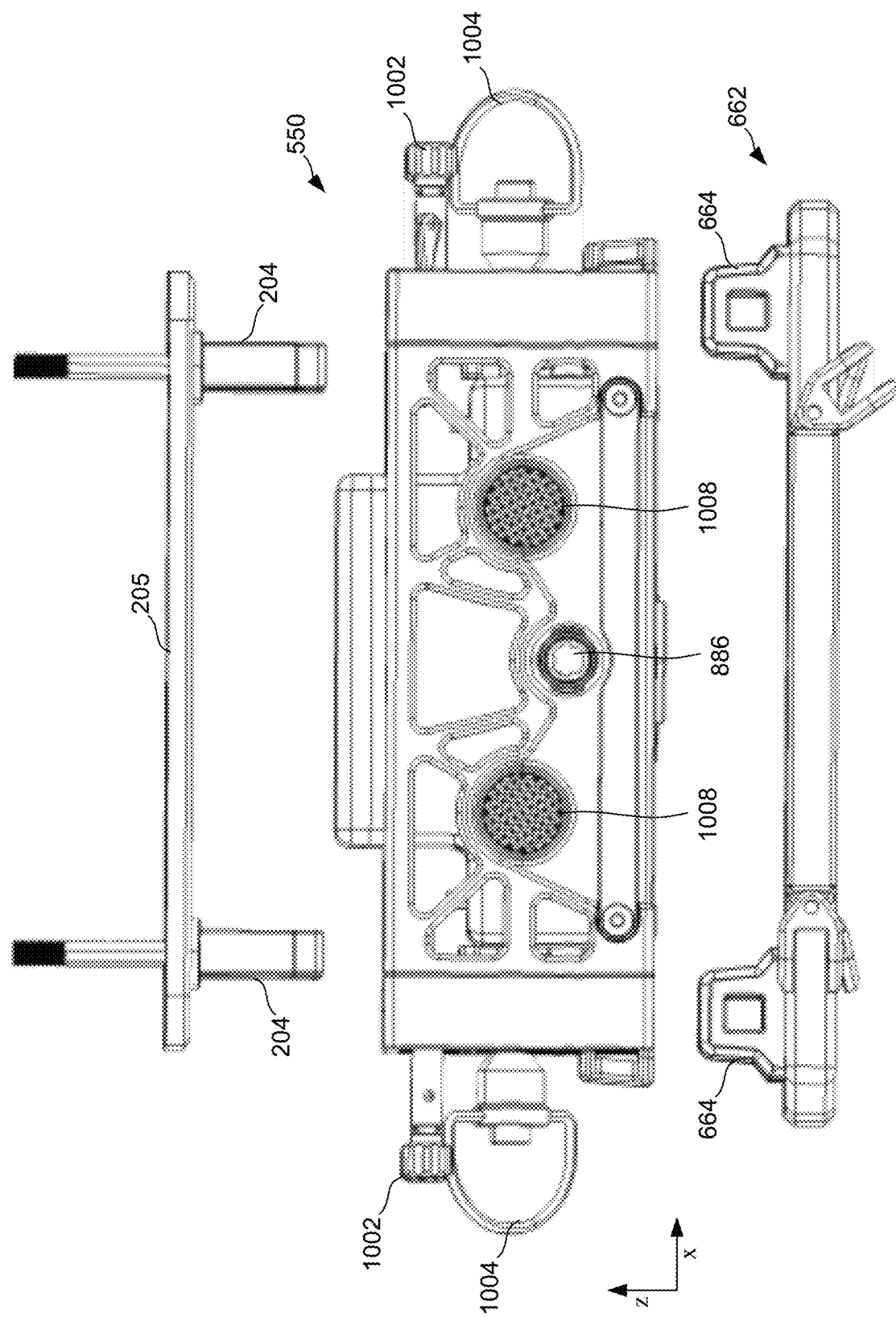
FIGS. 10A-E illustrate an example implementation of an MRD.

FIGS. 10A-E show an example implementation of MRD 550 in more detail. FIG. 10A shows a view looking along the y-direction with UAV lugs 204 above and separated from MRD 550 (e.g., prior to attachment) and drop-plate 662, including lugs 664, below and separated from MRD 550 (e.g., prior to attachment). Lugs 204 are attached to mount plate 205 in this example. Lugs 204 (and mount plate 205) may be attached to a UAV in a manner that limits transmission of vibration between the UAV and MRD 550 (e.g., vibration isolation features such as dampers may be included in mount plate 205 or between mount plate 205 and a UAV). Vibration isolation features may also be used to limit transmission of vibration between MRD 550 and a payload (e.g., dampers or other vibration isolation features may be included in MRD 550 and/or drop-plate 662). Pins 1002 are shown on either side of MRD 550 (two of four pins are visible in this view). Pins 1002 are captured so that they cannot be removed from MRD 550 without the use of tools. Pins 1002 are rotated for insertion into corresponding holes in lugs 204 when MRD 550 is in position with lugs 204 in corresponding openings in MRD 550. Pins 1002 include knurled portions to facilitate rotation. Pins 1002 may be considered parts of UAV-attachment mechanism 990.

Locking pins 1004 extend from either side of MRD 550 and include D-rings to facilitate removal. Locking pins 1004 may be inserted to lock corresponding payload latch mechanisms (e.g., to lock payload latch mechanisms in the closed position to prevent unintended dropping of a drop-payload). MRD 550 is configured with two payload latch mechanisms (one on either side) in FIG. 10A, each having a corresponding locking pin 1004.

FIG. 10A shows connector 886, which can be used to connect MRD to a UAV (e.g., by cable 880). On either side of connector 886 are switches 1008 (button type switches), which may be used to open or close corresponding payload latch mechanisms locally (e.g., without a command from a remote control).

Figure 10B:
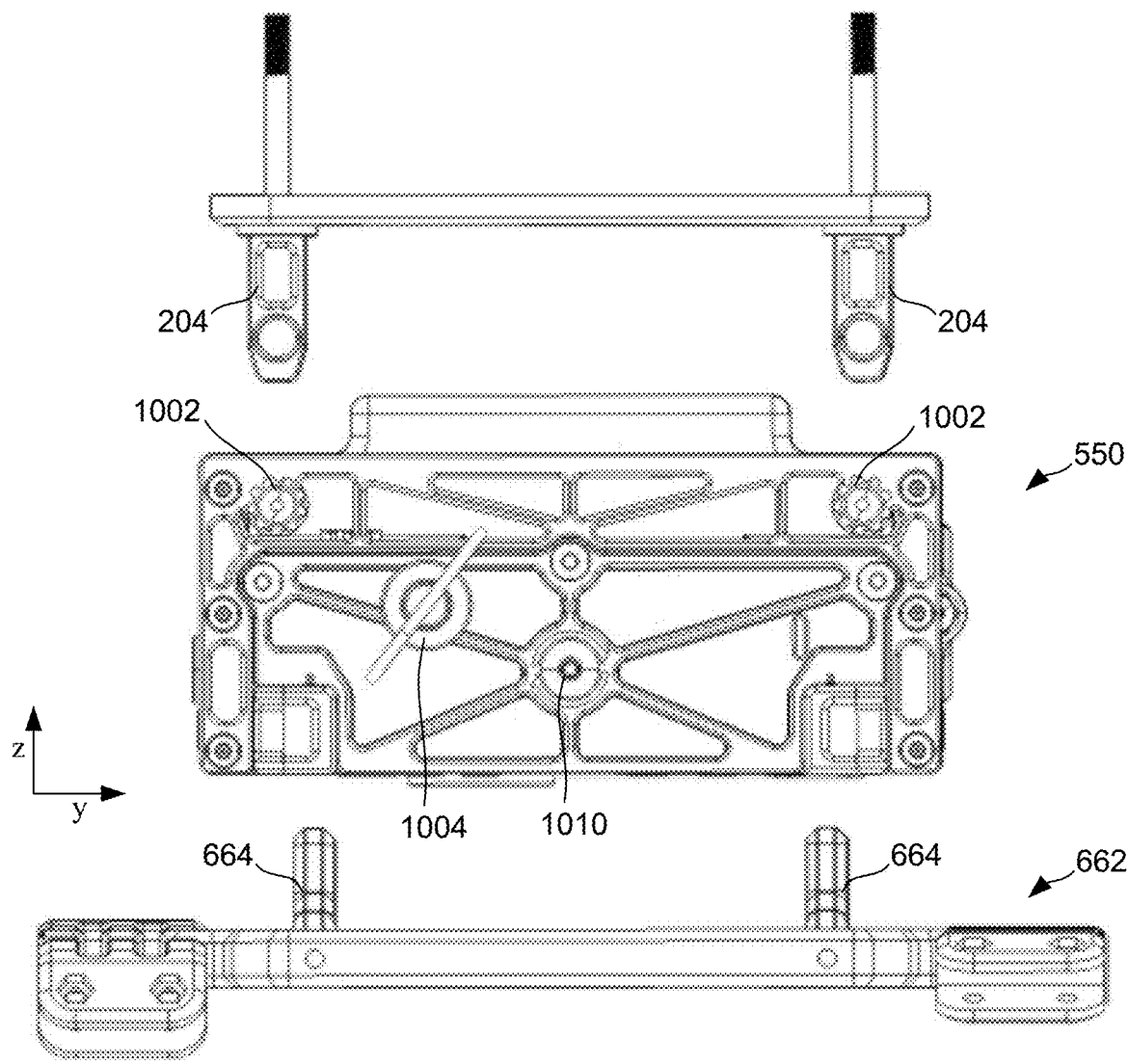

FIG. 10B shows MRD 550 from one side (looking along the x-direction) with UAV lugs 204 above and separated from MRD 550 (e.g., prior to attachment) and drop-plate 662, including lugs 664, below and separated from MRD 550 (e.g., prior to attachment) as in FIG. 10A. Two of pins 1002 can be seen in vertical alignment with lugs 204. FIG. 10B also shows locking pin 1004.

A manual engagement device 1010 can be seen on the side of MRD 5050. Manual engagement device 1010 may allow manual engagement with a payload latch mechanism to enable opening and closing of a latch mechanism manually (e.g., without electrical power and/or electronic communication). Manual engagement device 1010 may be used as an alternative to latch actuator 994 in case of power and/or communication loss. Manual engagement device 1010 may provide an interface that allows mechanical force (e.g., torque) to be applied manually to a latch component. For example, manual engagement device 1010 may be compatible with a screwdriver, wrench, Allen wrench, Torx driver, or other tool. Locking pin 1004 and manual engagement device 1010 are configured to respectively lock and manually operate a payload latch mechanism. A similar locking pin and manual engagement device are provided on the opposite side of MRD 550 for an additional payload latch mechanism. In other examples, a single locking pin may be used to lock more than one payload latch mechanism.

Figure 10C:
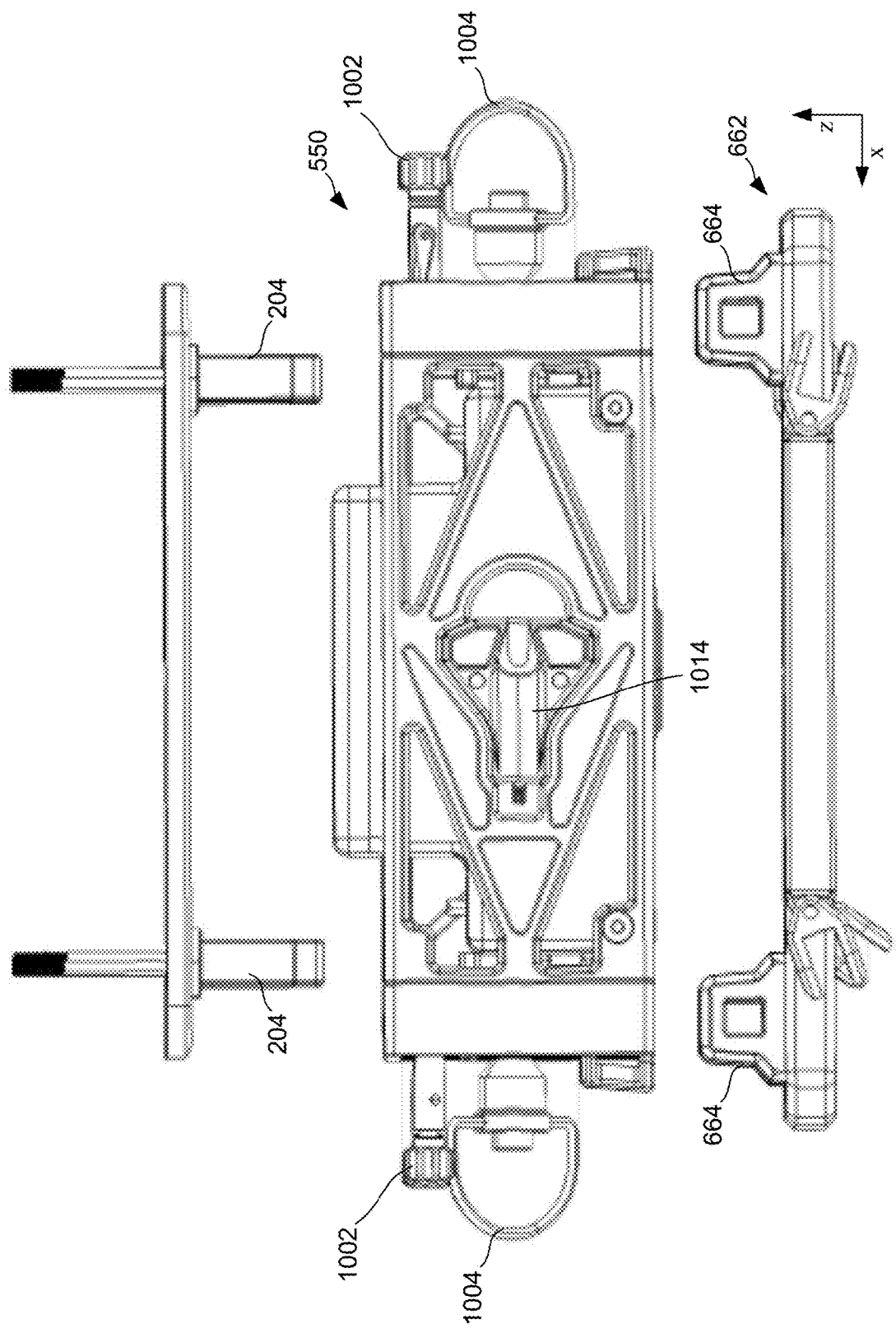

FIG. 10C shows MRD 550 from another perspective (opposite direction to that of FIG. 10A along y-direction). Pins 1002 and locking pins 1004 can be seen on either side of MRD 550. FIG. 10C shows tool 1014, which is compatible with manual engagement device 1010 (not visible in this view). Tool 1014 is clipped, snapped, fastened or otherwise held against a surface of MRD 550 so that it can easily be accessed and removed by a user. A user may insert tool 1014 into manual engagement device 1010 and turn it to manually open and close a payload latch device. Tool 1014 may have an appropriate form (e.g., screwdriver, wrench, Allen wrench, Torx driver, or other) and a hand-grip portion to allow insertion and rotation of manual engagement device 1010 by hand.

Figure 10D:
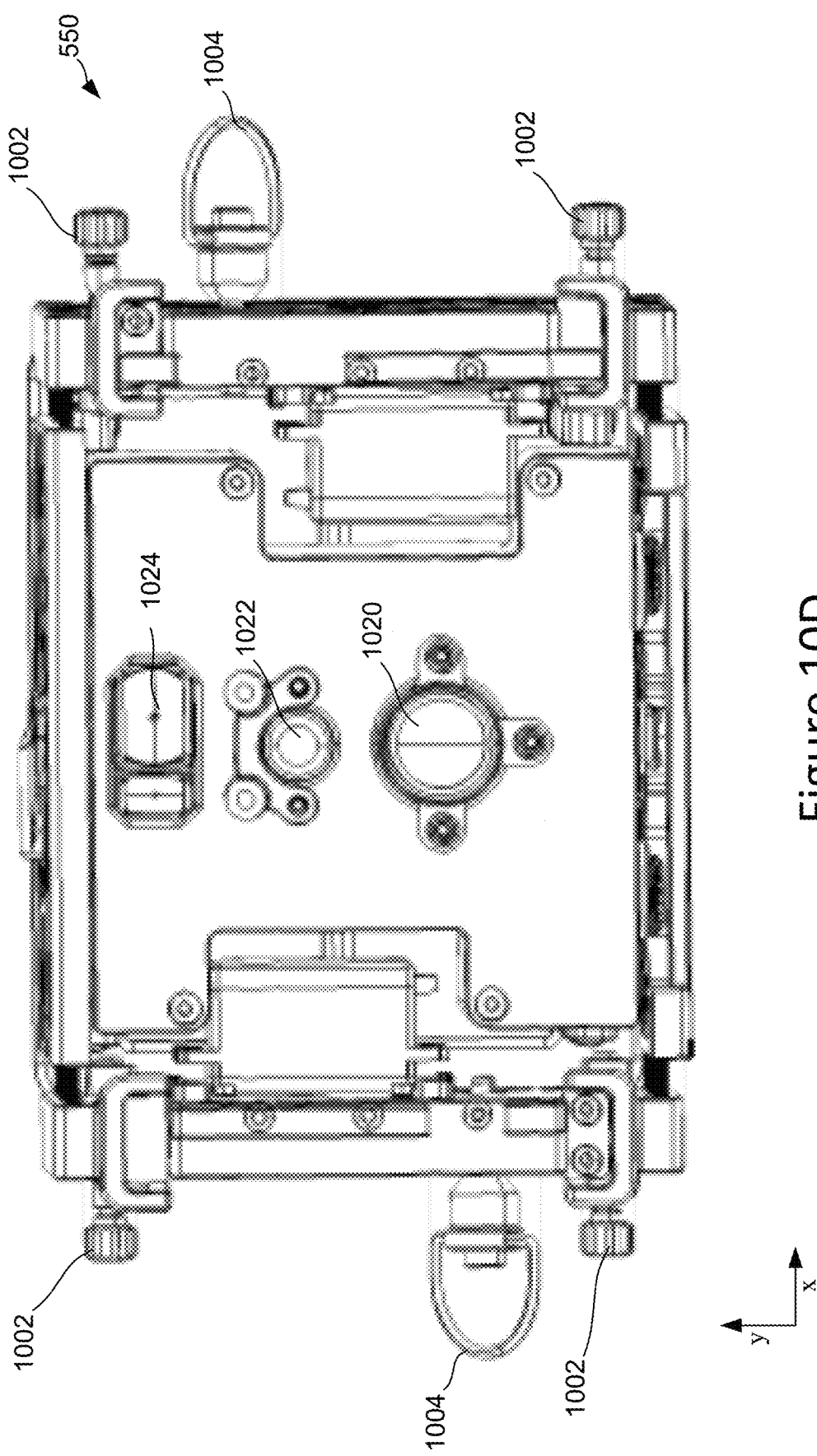

FIG. 10D shows MRD 550 from below (looking along the z-direction) and shows four pins (two on either side) to interface with UAV lugs (not visible in this view) and two locking pins 1004 to lock respective payload latch mechanisms. FIG. 10D also shows sensors that are located on the bottom surface of MRD 550 and are directed downwards (generally towards the ground during flight). The sensors include an infra-red camera 1020 (thermal camera), a visible camera 1022 (camera operating in the range of visible light, approximately 380-700 nm wavelength, also referred to as an "Electro-Optical" camera or "EO camera") and a rangefinder 1024. Sensors (e.g., sensors 1020, 1022, 1024) may provide feedback regarding an area below MRD 550, which may facilitate dropping a drop-payload at a target area and/or alignment of an MRD and drop-payload when picking up a drop-payload without manual intervention.

Figure 10E:
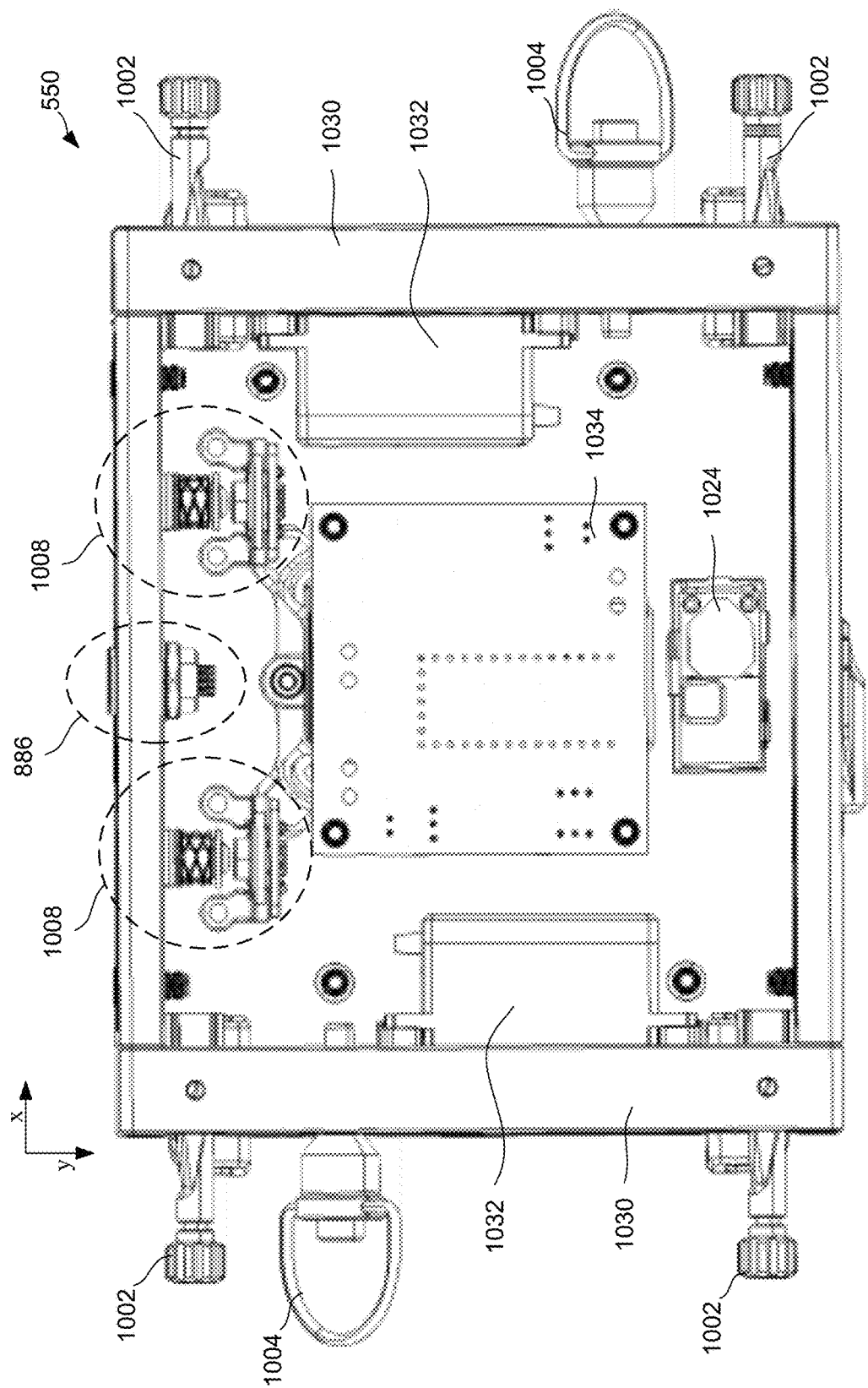

FIG. 10E shows MRD 550 from above (opposite orientation to that of FIG. 10D) with internal components visible (e.g., with one or more parts of enclosure 998 removed). FIG. 10E shows pins 1002 and locking pins 1004 each inserted in respective latch housings 1030, which house components of payload latch mechanisms and also function as parts of enclosure 998. Servo motors 1032 are also visible and are used as latch actuators for respective latch mechanisms in this example. A Printed Circuit Board Assembly (PCBA) 1034 is shown which forms part of the electronic system 996 and is connected to other parts of electronic system 996 including switches 1008, sensors (including rangefinder 1024) and connector 886 (which can connect PCBA 1034 with a UAV). PCBA 1034 is also connected to servo motors 1032, which may be powered and via PCBA 1034. PCBA 1034 may include control circuits (e.g., one or more processor) to control components of MRD 550 including payload latch mechanism(s).

Figure 11A:
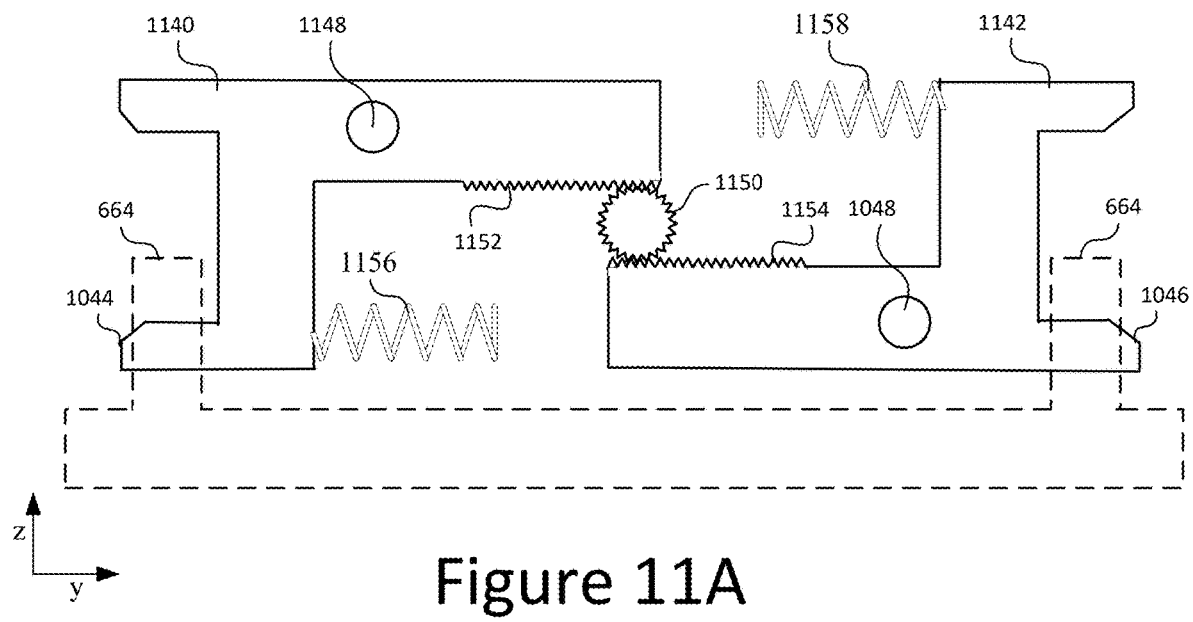
FIGS. 11A-B illustrate an example of a payload latch mechanism of an MRD.

FIG. 11A shows an example of components of a payload latch mechanism (e.g., payload latch mechanism 992) which may be located in latch housing 1030. FIG. 11A shows a first arm 1140 and a second arm 1142 that can move along the y-direction (e.g., may be captured within latch housing 1030 so that they are constrained to slide along paths that are limited to straight line motion along the y-direction). A first engagement feature 1044 at the end of first arm 1040 is shown engaging a lug 664 (shown by dashed lines) of a drop-payload. A second engagement feature 1046 at the end of second arm 1042 is shown engaging another lug 664 of the drop-payload. Lugs 664 may have appropriate holes to allow insertion of first engagement feature 1044 and second engagement feature 1046, which hold lugs 664 and thereby hold the drop payload when the payload latch mechanism is in the closed position with first and second arms 1140 and 1142 in the extended positions shown. Engagement features 1044 and 1046 may be beveled or otherwise shaped to facilitate insertion in corresponding openings in lugs 664. For example, beveled surfaces of engagement features 1044 and 1046 form ramps that provide indexing and camming action.

A circular gear 1150 engages first arm 1140 and second arm 1142. Circular gear 1150 has teeth or cogs that engage corresponding teeth 1152 on first arm 1140 and teeth 1154 on second arm 1142 to ensure that first arm 1140 and second arm 1142 move in tandem (e.g., simultaneously extend outwards from circular gear 1150 or retract inwards towards circular gear 1150). Circular gear 1150 is rotatable by a latch actuator (e.g., latch actuator 994) to move the first arm 1140 and second arm 1142. For example, a shaft from a servo motor (e.g., servo motor 1032) may be directly or indirectly coupled to circular gear 1150. Circular gear 1150 may also be rotatable manually using a manual engagement device (e.g., manual engagement device 1010).

A first spring 1156 is shown providing an extending force on first arm 1140 (force in the negative y-direction). A second spring 1158 is shown providing an extending force on second arm 1142 (force along the positive y-direction). Springs 1156 and 1158 hold the first arm 1040 and second arm 1042 in the extended positions shown to secure lugs 664 and thereby secure a drop-payload. The springs act as a safety feature in case of power loss.

A hole 1148 is provided in each arm to allow insertion of a locking pin (e.g., locking pin 1004) when arms are extended and thereby prevent any movement of the payload latch mechanism from closed to open, which could cause unwanted release of a drop-payload. Because arms are coupled by circular gear 1050, locking one arm with a locking pin is sufficient to lock the payload latch mechanism. An opening or window may be provided in latch housing 1030 to enable a user to visually confirm when the payload latch mechanism is in the closed (extended) position (e.g., prior to UAV launch with a drop-payload).

Figure 11B:
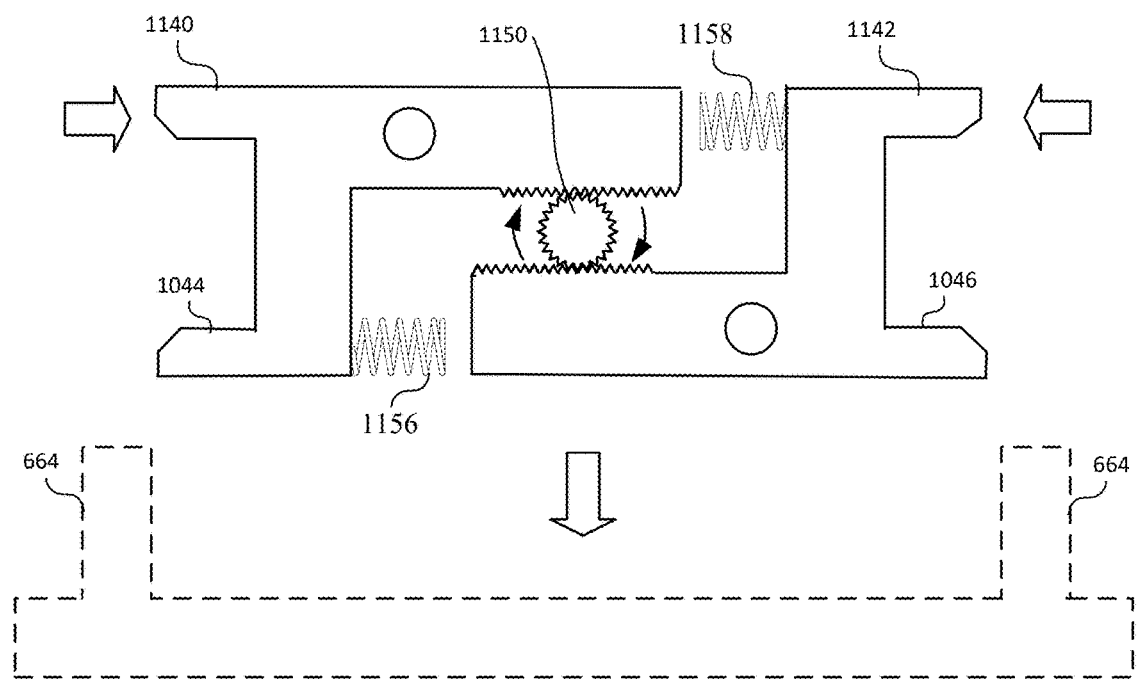

FIG. 11B shows the payload latch mechanism components with first arm 1040 and second arm 1042 in retracted positions that results from turning circular gear 1150 clockwise as shown (e.g., turned by a latch actuator or manually). With first arm 1040 and second arm 1042 in retracted positions as shown (retracted with respect to the position of FIG. 11A as indicated by arrows), first engagement feature 1044 and second engagement feature 1046 no longer engage lugs 664. With lugs 664 disengaged from engagement features 1044 and 1046, lugs 664 and the drop-payload are free of the MRD and the drop-payload may separate from the MRD (and UAV) under gravitational force. The payload latch mechanism may be considered to be in the open position when arms are retracted as shown in FIG. 11B (as opposed to the closed position shown in FIG. 11A). The open position allows a drop-payload to be dropped and also allows insertion of lugs for attachment of a payload. Springs 1156 and 1158 are compressed when arms 1140 and 1142 are retracted. Thus, without force applied by circular gear 1150, the payload latch mechanism returns to the closed position. This ensures that any power loss will not result in unintended dropping of a drop-payload.

Figure 12:
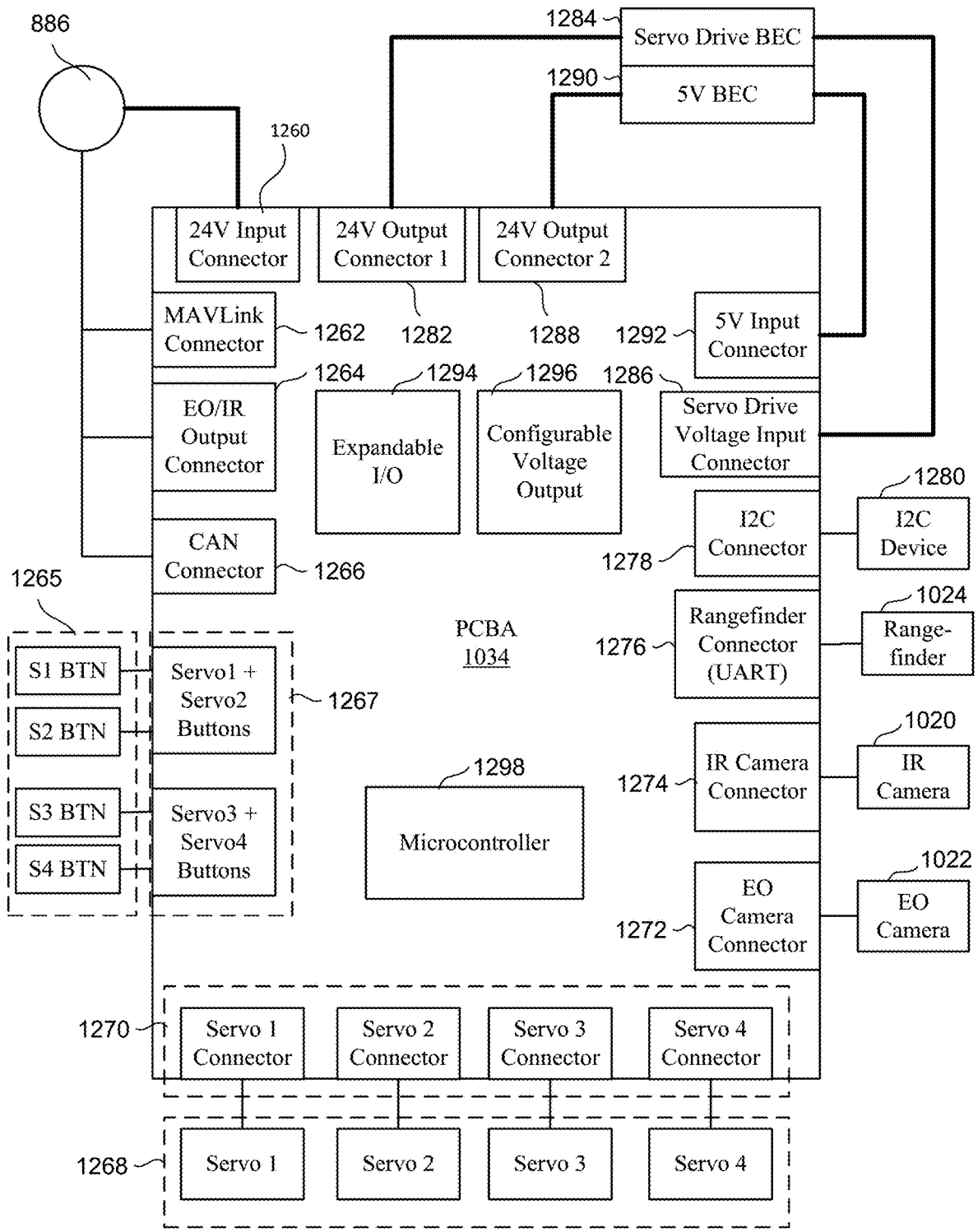
FIG. 12 illustrates an example of components of an electronic system of an MRD.

FIG. 12 shows an example implementation of electronic system 996 of MRD 550 including PCBA 1034 and other electronic components. Connector 886 provides a 24-volt electrical supply (from a UAV) to 24V Input connector 1260 and also provides communication via MAVLink Connector 1262 (while MAVLink is the communication protocol used in this example, the present technology is not limited to any particular protocol). This may allow commands to be sent from a remote control, through a UAV (e.g., through wireless receiver 215), to PCBA 1034. Connector 886 is also connected to EO/IR Output Connector 1264, which provides output from a visible (EO) camera and/or infrared (IR) camera via connector 886 (e.g., via the UAV to a remote control). Connector 886 is also connected to a Controller Area Network (CAN) Connector 1266, which may enable communication with additional components. The MRD can support a wide range of input voltage (e.g., up to 50.4 V).

Four buttons 1265 (S1 BTN to S4 BTN) are connected to corresponding switches 1267 on PCBA 1034 (e.g., switches 1008), corresponding to four servo motors 1268 (Servo 1 to Servo 4) operating up to four payload latch mechanisms (e.g., servo motors 1032). Servo motors 1268 are connected by four connectors 1270 on PCBA 1034. The number of payload latch mechanisms and servos may depend on the desired drop-payload(s) and the number of buttons may equal the number of servos so that they can be individually operated. In some cases, one button may operate more than one servo (e.g., where servos and latches are only operated together). Servos may be activated in response to commands individually, or otherwise (e.g., two or more servos activated in parallel).

EO camera 1022 is connected to PCBA 1034 by EO Camera Connector 1272. IR Camera 1020 is connected to PCBA 1034 by IR Camera Connector 1274. Rangefinder 1024 is connected to PCBA 1034 by Rangefinder Connector 1276 (e.g., using a Universal Asynchronous Receiver-Transmitter or UART interface). A I2C Connector 1278 is provided for communication with one or more (optional) devices using the I2C protocol (FIG. 12 shows I2C Device 1280).

One or more power circuits may be provided in PCBA 1034 or elsewhere to operate servos and/or other components. FIG. 12 shows 24V Output Connector 1 1282 connected to Servo Drive BEC (Battery Eliminator Circuit) 1284, which provides an electrical supply to Servo Drive Voltage Input Connector 1286. Output Connector 2 1288 is connected to 5V BEC 1290, which provides a 5 volt electrical supply to 5V Input Connector 1292. Servo Drive BEC 1284 and 5V BEC 1290 may be implemented by voltage regulators that convert the 24 volt supply to appropriate voltages. The MRD can support a wide range of input voltage (e.g., up to 50.4 V) and the Servo Drive BEC is adjustable to meet voltage requirements of a wide range of electric motors.

An expandable Input/output circuit, "Expandable I/O" 1294 is provided to allow additional components to be connected to electronic system 996. For example, additional sensors or other electronic components (e.g., cameras, rangefinders, lidar, Global Positioning System (GPS) and/or lights) may be connected to expandable I/O 1294. A Configurable Voltage Output circuit 1296 is configurable to provide power for such electronic components at configurable voltage(s). This allows a wide range of additional components to be integrated with MRD 550 according to desired configuration (e.g., according to payload(s) and/or environmental or other conditions).

In an example, Expandable I/O 1294, Configurable Voltage Output voltage circuit 1296 and/or other circuits may be connected to one or more drop-payload components. In some cases, a drop-payload may receive power from MRD 550 and/or be in communication with MRD 550 via wired connections (and may be in communication with a UAV and/or remote control through MRD 550).

A controller (microcontroller 1298) is provided to control other components shown and to communicate with a UAV through connector 886 (e.g., via one or more of MAVLink Connector 1262, EO/IR Output Connector 1264 and/or CAN connector 1266) and via the UAV, communicate with a remote control (e.g., receiving commands from a remote control and sending video and other data to the remote control). Microcontroller 1298 is configured to control servo motors 1268 and thereby control payload latch mechanisms in response to commands. Servo motors may be activated individually or otherwise according to a received command. For example, microcontroller 1298 may be configured to actuate Servo 1 and not Servo 2 in response to a first command, actuate the Servo 2 and not Servo 1 in response to a second command, and actuate both Servo 1 and Servo 2 simultaneously in response to a third command.

Microcontroller 1298 may include programmable logic devices (PLDs) and/or software/firmware configurable circuits to perform different operations. In some cases, microcontroller 1298 may be configured to process data (e.g., from sensors including cameras 1020 and 1022 and rangefinder 1024) and perform operations according to determinations made from processing the data. For example, microcontroller 1298 may determine that it is at a drop location based on visual imagery and/or other data (e.g., GPS data) and may automatically drop a drop-payload in response (e.g., without a command from a remote control). Microcontroller 1298 may be configured to recognize a drop-payload (e.g., to recognize a frame of a drop-plate as discussed further below) and to align with lugs of the drop-payload using visual imagery and/or other data for pickup of a drop-payload. The onboard microcontroller is capable of converting data from additional sensors, which may use different communication protocols) and sending that data to the UAV via communication protocol in use by the MRD and UAV. This capability allows for the addition of sensors to the UAV without the need for additional electrical connections. Microcontroller 1298 may be configured (e.g., by software, hardware, or a combination) to convert external sensor data to a protocol used between microcontroller 1298 and the UAV and send it to the UAV without adding another communication channel or reconfiguring the existing communication circuit or protocol.

Aspects of the present technology are directed to MRDs that may be used to hold and drop a wide range of payloads and to drop-payloads that may use a drop-plate (e.g., as illustrated in the examples of FIGS. 6A-C) to facilitate payload attachment to an MRD-equipped UAV. An example drop-plate may be configured as a frame that has lugs in a predetermined arrangement that corresponds to locations of engagement features of an MRD.

Figure 13A:
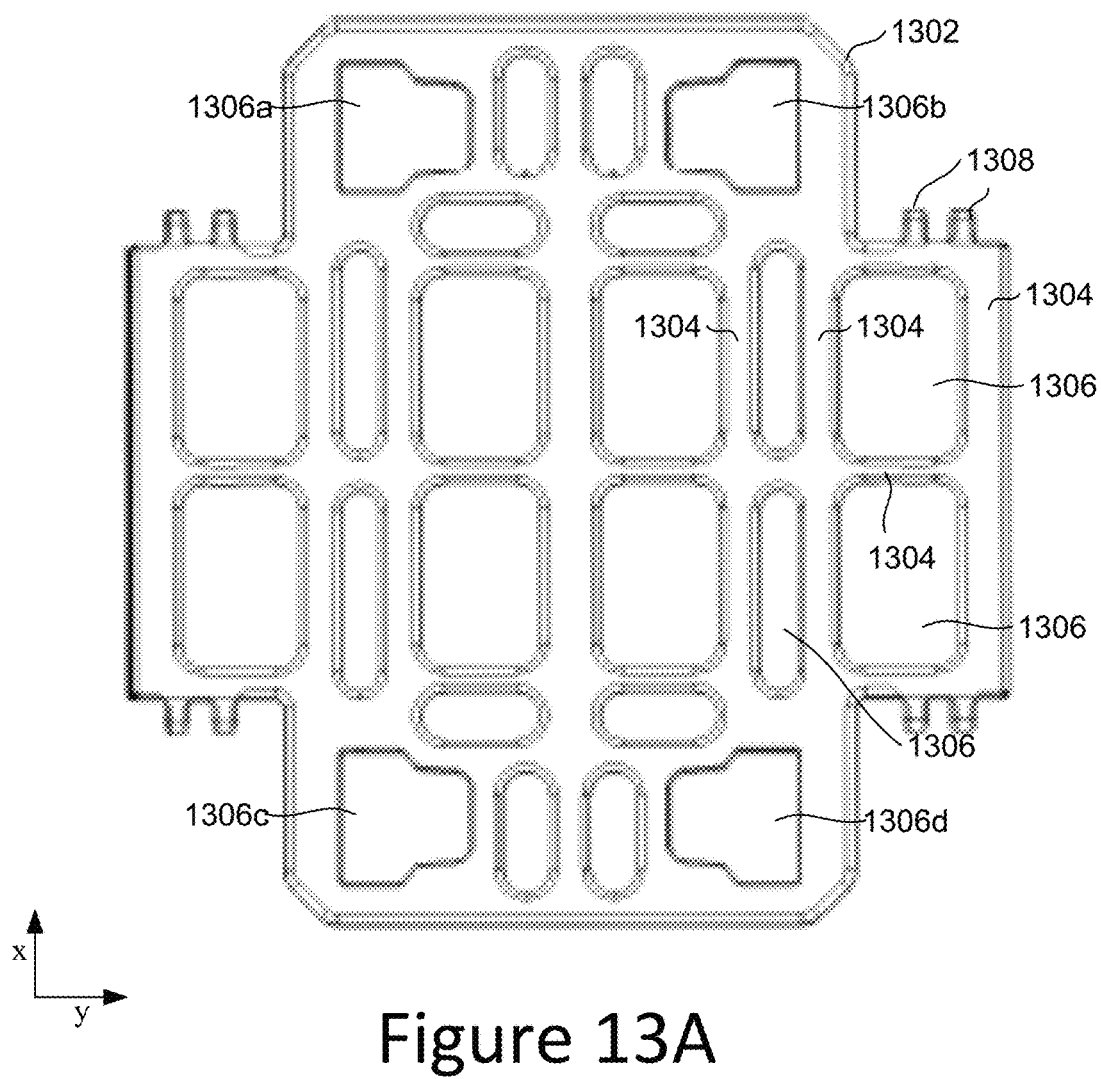
FIGS. 13A-B illustrate an example of a frame for a drop-plate.

FIG. 13A shows an example of a frame 1302 that may be used to form a drop-plate such as drop-plate 662. Frame 1302 includes frame members that are separated by openings (e.g., holes that extend through frame 1302 in the z-direction in FIG. 13A). For example, FIG. 13A shows frame members 1304 and openings 1306. Frame 1302 may be made of any suitable material, for example, a strong, lightweight material such as glass-filled Nylon or polycarbonate. Openings may be of any sizes and shapes. In some cases, some openings have simple geometric shapes while some openings may be configured to be compatible with specific payload items or drop-plate features. In FIG. 13A, openings 1306a-d are configured to accommodate folding lugs (not shown) so that the folding lugs can be folded onto frame 1302 to provide a compact unit for transport and storage. Frame 1302 also includes attachment features such as attachment features for lugs and attachment features 1308, which may be used to attach buckles (not shown) or other components that may in turn be used to attach a payload to frame 1302. Frame 1302 may have dimensions that are determined by the dimensions of a corresponding UAV MRD and by expected payloads. Frame 1302 may be substantially planar (e.g., extending along the x-y plane with dimension in the z-direction being significantly less than in the x and y directions). For example, lateral dimensions (in x and y directions) may be 6-12 inches or more, while thickness (in z-direction) may be less than an inch (e.g., 0.25-0.5 inches). Frame 1302 has openings and frame members in a pattern that may be easily identifiable for image recognition (e.g., using images from cameras 1020 and 1022). This may facilitate automated alignment of a UAV with a drop-plate. In some cases, alignment features (e.g., stripes, geometric shapes and/or reflectors) may be added to a drop-plate to further facilitate recognition and alignment.

Figure 13B:
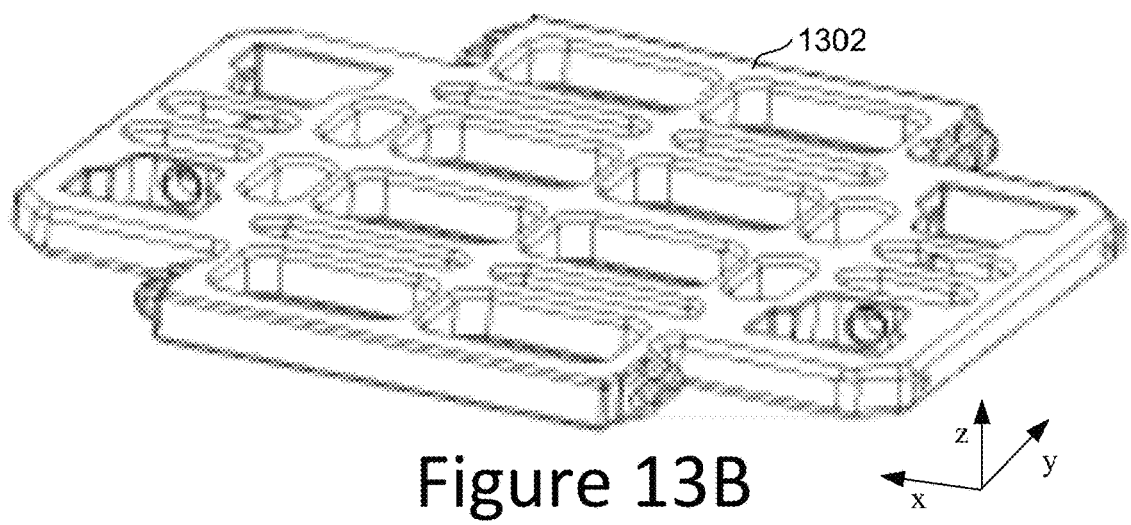

FIG. 13B shows frame 1302 in perspective view of frame 1302, showing that it extends along the x-y plane and is relatively thin (in the z-direction).

Figure 14A:
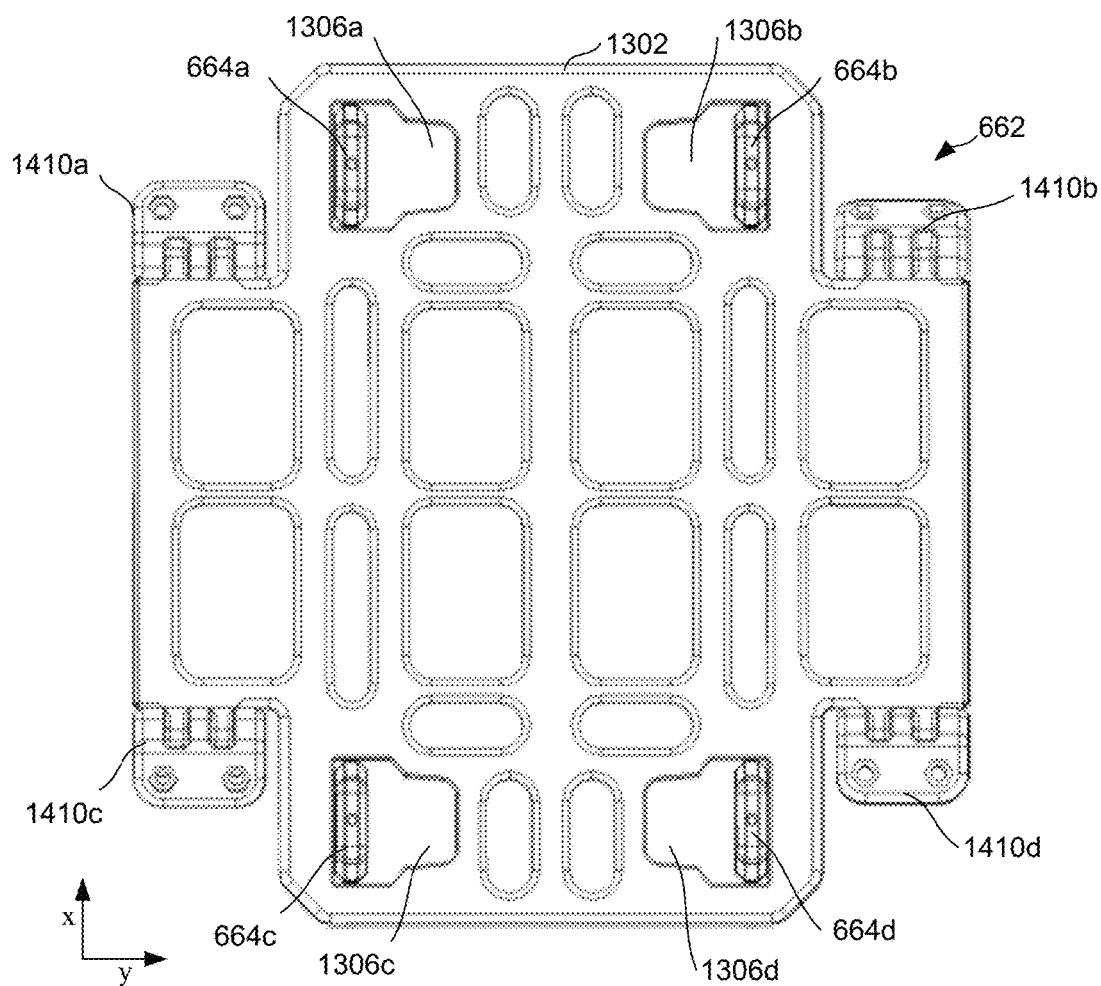
FIGS. 14A-G illustrate an example of a drop-plate including lugs and buckles.
Figure 14B:
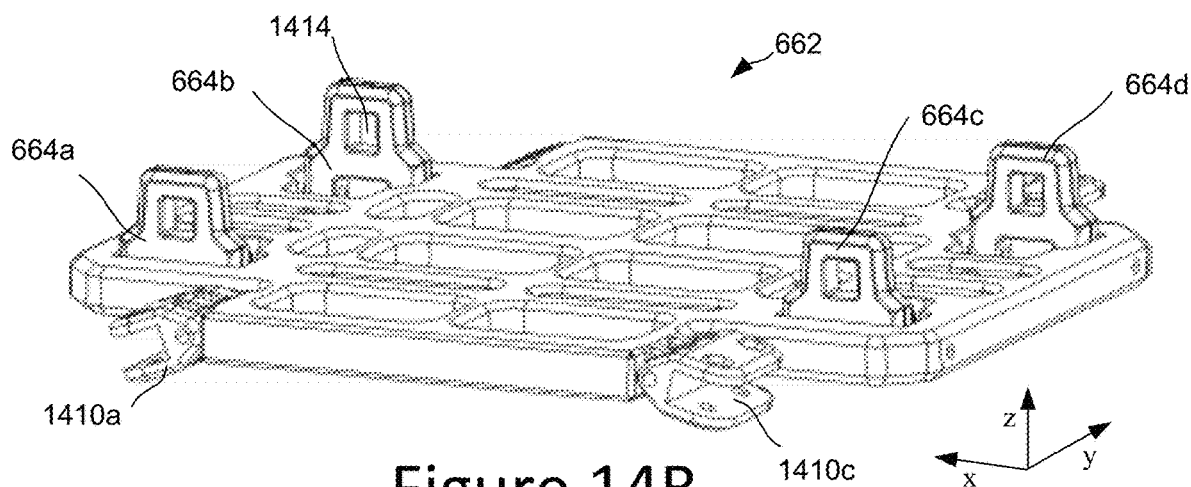

FIGS. 14A-B show views of drop-plate 662, which includes frame 1302, with lugs 664a-d in corresponding openings 1306a-d. Lugs 664a-d are in an extended or unfolded configuration in FIGS. 14A-B. In the unfolded configuration, lugs 664a-d extend perpendicular to the plane of frame 1302 (e.g., lugs 664a-d extend in the z-direction, perpendicular to the x-y plane of frame 1302). Lugs 664a-d are arranged in a rectangular pattern (e.g., at corners of a rectangle) corresponding to the pattern of engagement features of MRD 550. In this configuration, lugs 664*a-d* may be engaged by corresponding engagement features of a payload latch mechanism of an MRD (e.g., engagement features 1044 and 1046 as illustrated in FIGS. 11A-B).

Lugs 664*a-d* may be held in the unfolded (perpendicular) configuration by corresponding lug latches that prevent rotation of lugs 664*a-d* (e.g., manual release of lug latches may be needed to rotate lugs 664*a-d* from the unfolded configuration to the folded configuration). Lug latches may be implemented by detents or otherwise. Lugs 664*a-d* may also latch in the folded position using the same lug latches or otherwise. Lugs 664*a-d* may have a 90 degree range of rotation that extends from the folded configuration to the unfolded configuration. Alternatively, lugs 664*a-d* may have a 180 degree range of rotation and may be unfolded on either side of frame 1302 (e.g., drop-plate 662 may be usable either way up so that regardless of which side a payload is attached on, lugs 664*a-d* can be extended on the opposite side). In some examples, lugs 664*a-d* are spring-loaded so that once released from the folded configuration, they spring into the unfolded configuration (e.g., rotate through 90 degrees).

FIG. 14A also shows buckles 1410*a-d*, which may be used to attach straps (e.g., straps 668 of FIGS. 6B-C). Buckles 1410*a-d* are rotatably attached so that each buckle has a range of rotation about an axis (e.g., hinge-like attachment with a central pin). Straps may have fittings that snap into buckles 1410*a-d* for quick connection and disconnection.

FIG. 14B shows a perspective view of drop-plate 662 showing lugs 664*a-d* in the unfolded configuration. Each of lugs 664*a-d* has a hole that extends through the lug to allow engagement of engagement features. For example, lug 664*b* includes hole 1414 that is sized to allow insertion of an engagement feature (e.g., engagement feature 1044 or 1046). In other examples, lugs may have holes that do not extend through from one side of the lug to the other (e.g., recesses) to enable engagement or may use other features (e.g., hook type features).

Figure 14C:
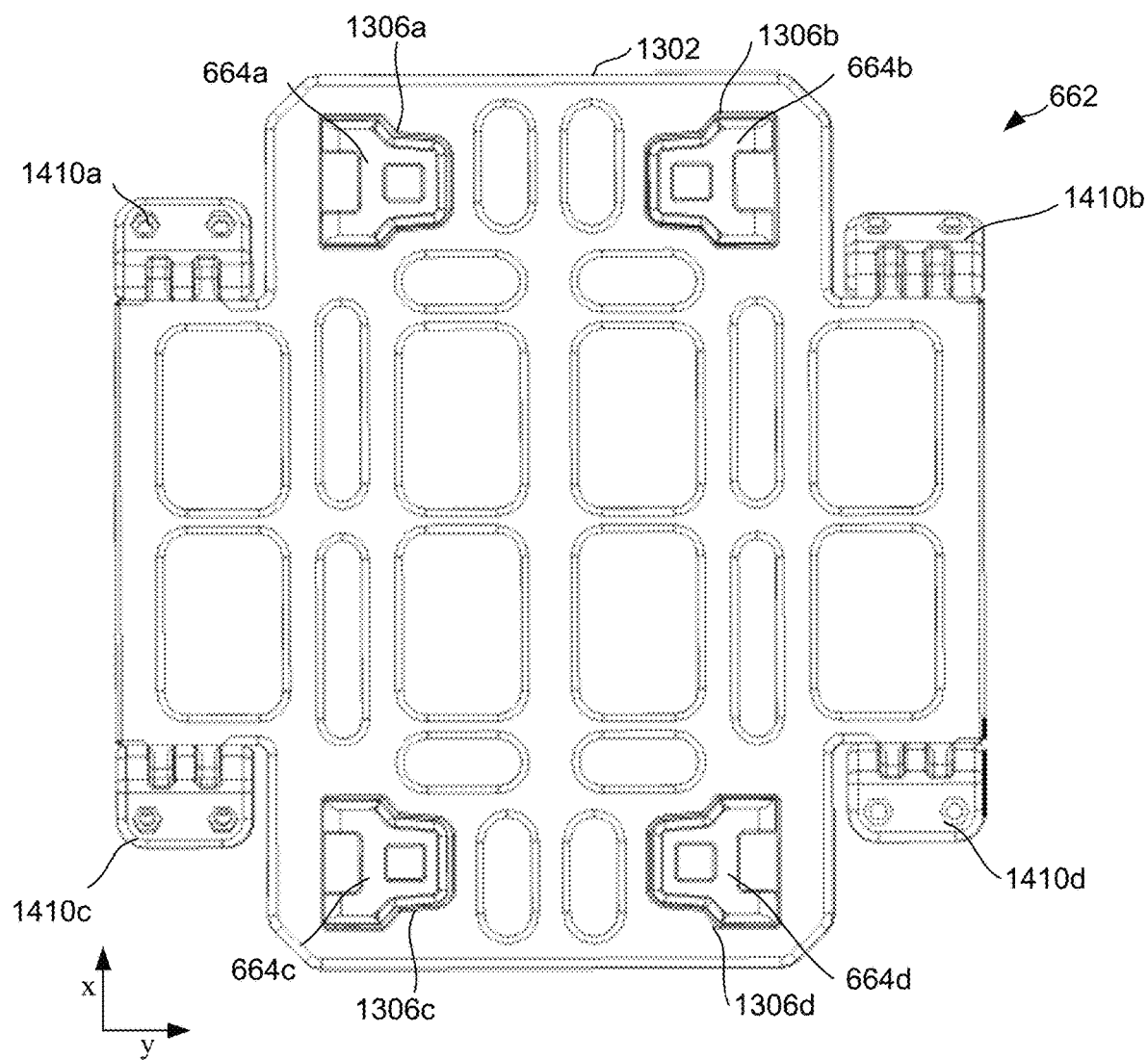

FIG. 14C shows drop-plate 662 with lugs 664*a-d* in the folded configuration. In this configuration, lugs 664*a-d* are recessed into corresponding openings 1306*a-d*. In this configuration, drop-plate 662 is compact, which may facilitate transport and storage. For example, lugs 664*a-d* may be completely recessed into corresponding openings 1306*a-d* so that each of lugs 664*a-d* has a top surface that is substantially coplanar with a top surface of frame 1302 and a bottom surface that is substantially coplanar with a bottom surface of frame 1302.

Figure 14D:
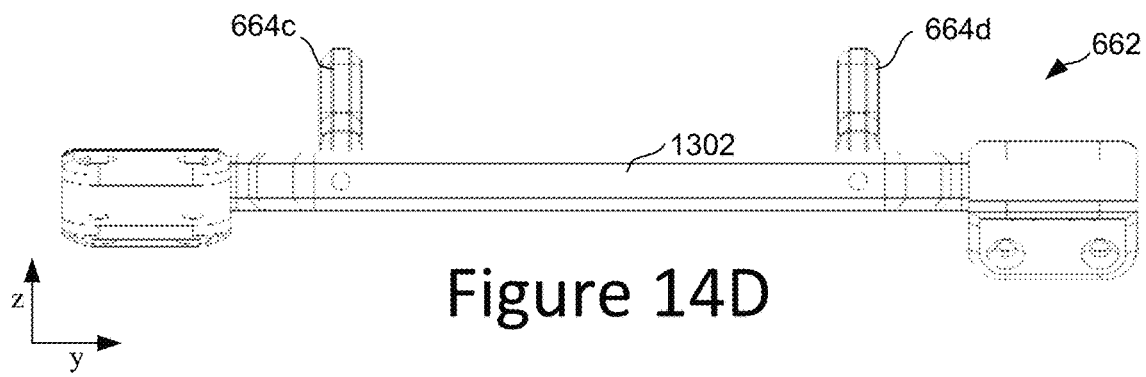
Figure 14E:
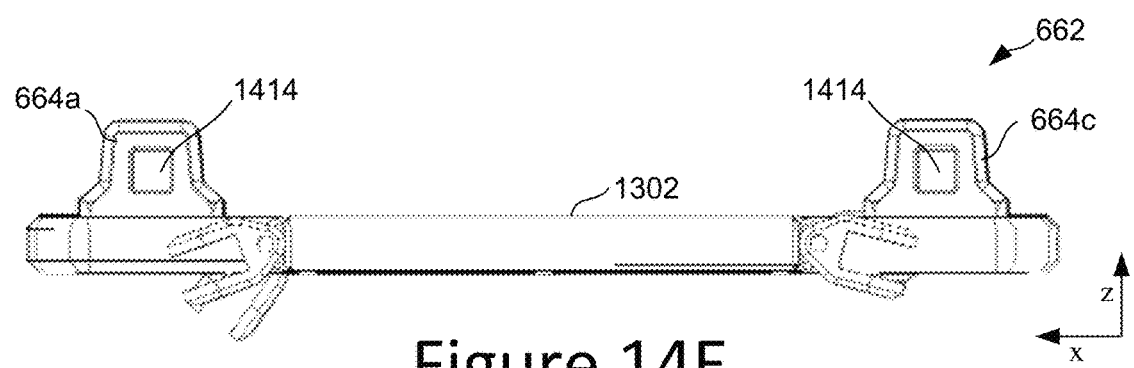
Figure 14F:
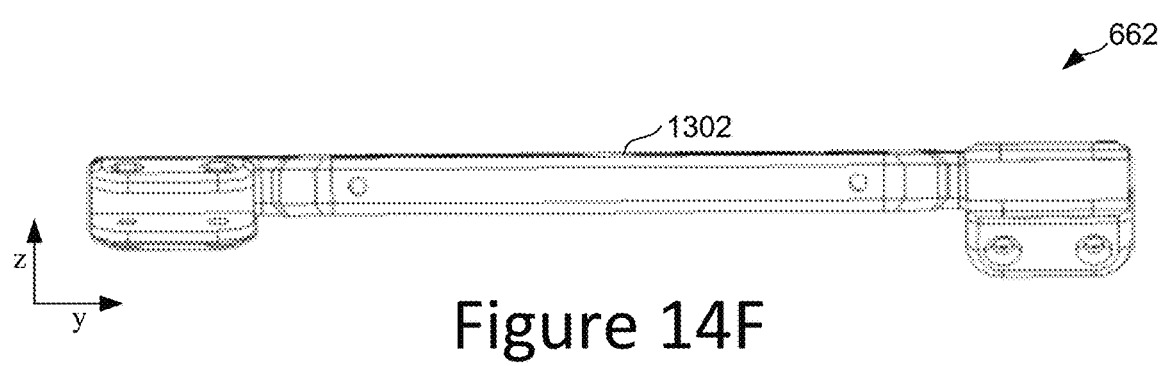
Figure 14G:
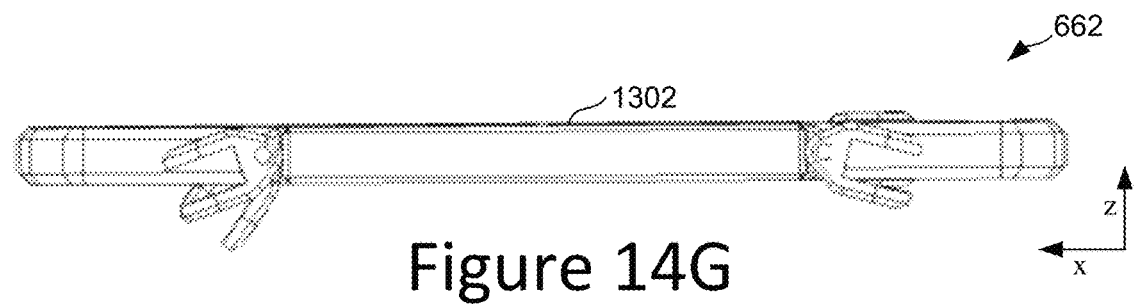

FIGS. 14D-G show side views of drop-plate 662 from different sides and in different configurations. FIG. 14D shows a view along the x-direction with lugs 664*a-d* in the unfolded configuration (only lugs 664*c* and 664*d* are visible from this angle). FIG. 14E shows a view along the y-direction with lugs 664*a-d* in the unfolded configuration (as in FIG. 14D). Only lugs 664*a* and 664*c* are visible from this angle. Holes 1414 through lugs 664*a* and 664*c* can be clearly seen in this view. FIG. 14F shows a view along the x-direction with lugs 664*a-d* in the folded configuration (lugs 664*a-c* located in openings in frame 1302 and not visible in this view). FIG. 14G shows a view along the y-direction with lugs 664*a-d* in the folded configuration and not visible.

While FIGS. 14A-G show an example of a drop-plate with four lugs and four buckles, the number, location, shape, materials of lugs and buckles may be different according to requirements (e.g., according to an MRD used). In some cases, an MRD may hold two or more drop-payloads (e.g., as in FIG. 7) with each drop-payload including a drop-plate.

Figure 15:
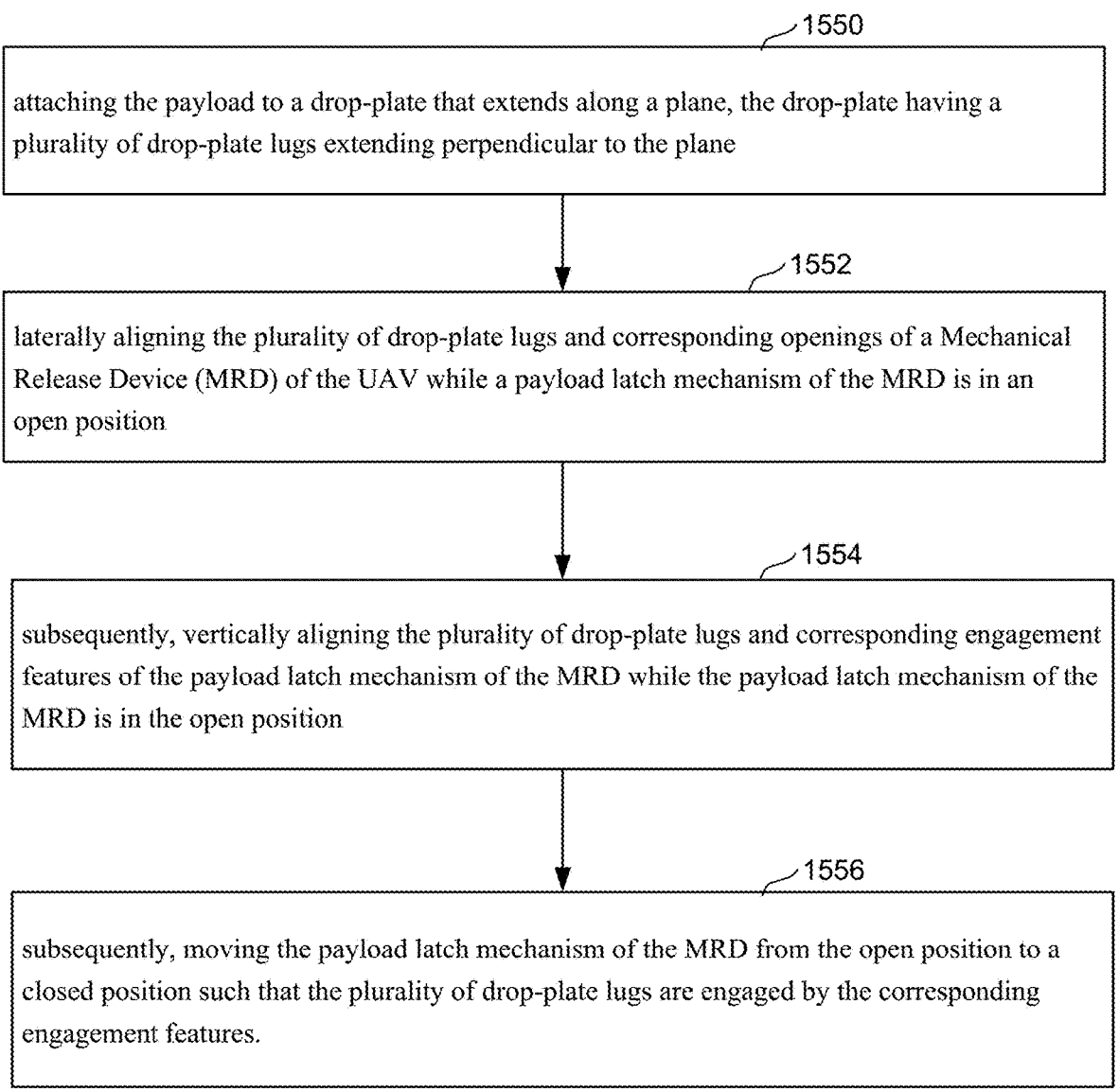
FIG. 15 illustrates an example of a method of attaching a payload to a UAV.

FIG. 15 illustrates an example of a method of attaching a payload to an Unmanned Aerial Vehicle (UAV), that includes attaching the payload to a drop-plate that extends along a plane, the drop-plate having a plurality of drop-plate lugs extending perpendicular to the plane 1550, laterally aligning the plurality of drop-plate lugs and corresponding openings of a Mechanical Release Device (MRD) of the UAV while a payload latch mechanism of the MRD is in an open position 1552 and subsequently, vertically aligning the plurality of drop-plate lugs and corresponding engagement features of the payload latch mechanism of the MRD while the payload latch mechanism of the MRD is in the open position 1554. The method further includes, subsequently, moving the payload latch mechanism of the MRD from the open position to a closed position such that the plurality of drop-plate lugs are engaged by the corresponding engagement features 1556. Alignment of the lugs and corresponding openings and engagement features may be performed manually (e.g., by lifting a drop-load into place) or by moving an MRD-equipped UAV into position over a drop-load (e.g., using sensors such as cameras 1020, 1022 of MRD 550 to align with a drop-plate).

An example of An Unmanned Aerial Vehicle (UAV) mechanical release device includes a quick-release UAV-attachment mechanism to attach the UAV mechanical release device to a UAV and a payload latch mechanism to secure and release a drop-payload from the UAV mechanical release device. A latch actuator may be connected to the payload latch mechanism to move the payload latch mechanism between a closed position and an open position.

The latch actuator may include a motor to move the payload latch mechanism between the closed position and the open position. The UAV mechanical release device may further include a control circuit connected to the motor, the control circuit configured to actuate the motor in response to a command received by the control circuit. The UAV mechanical release device may further include a cable to connect the control circuit to the UAV, the cable configured to provide power and communication from the UAV to the control circuit. The latch actuator may include a manual switch located on a surface of the mechanical release device, the manual switch configured to manually actuate the motor to move the payload latch mechanism between the closed position and the open position. The payload latch mechanism may further include a manual engagement device to manually move the payload latch mechanism between the closed position and the open position. The quick-release UAV-attachment mechanism may include one or more pins configured to engage corresponding lugs of the UAV. The UAV mechanical release device may further include an additional payload latch mechanism; and an additional latch actuator connected to the additional payload latch mechanism to move the additional payload latch mechanism between a closed position and an open position. The UAV mechanical release device may further include a control circuit connected to the latch actuator and the additional latch actuator, the control circuit configured to actuate the latch actuator and the additional latch actuator in response to one or more commands received by the control circuit. The control circuit is configured to actuate the latch actuator and not the additional latch actuator in response to a first command, actuate the additional latch actuator and not the latch actuator in response to a second command, and actuate both the latch actuator and the additional latch actuator in tandem in response to a third command.

An example of an Unmanned Aerial Vehicle (UAV) mechanical release device includes an enclosure; a UAV-attachment mechanism to attach the UAV mechanical release device to a UAV, the UAV-attachment mechanism including a plurality of captured pins to engage a corresponding plurality of lugs of the UAV, the plurality of captured pins extending through the enclosure; a payload latch mechanism to secure and release a drop-payload from the UAV mechanical release device, the payload latch mechanism including one or more engagement features to engage corresponding features of the drop-payload; and a motor connected to the payload latch mechanism to move the payload latch mechanism between a closed position in which the one or more engagement features engage the corresponding features of the drop-payload and an open position in which the one or more engagement features are disengaged from the corresponding features of the drop-payload.

The payload latch mechanism may include a circular gear coupled to a first arm and a second arm, the one or more engagement features may include a first engagement feature at an end of the first arm and a second engagement feature at an end of the second arm, the circular gear may be rotatable by the motor to move the first and second arms and first and second engagement features in tandem. The UAV mechanical release device may further include a manual engagement device to manually rotate the circular gear and move the payload latch mechanism between the closed position and the open position to manually secure and release the drop-payload. The UAV mechanical release device may further include a switch on an exterior surface of the enclosure, the switch configured to control the motor to move the payload latch mechanism between the closed position and the open position. The UAV mechanical release device may further include a locking pin to lock the payload latch mechanism in the closed position. The UAV mechanical release device may further include a control circuit configured to actuate the motor in response to a command received by the control circuit; and a cable to connect the control circuit to the UAV, the cable configured to provide power from the UAV to the control circuit and to carry communication, including the command, between a communication circuit of the UAV and the control circuit. The UAV mechanical release device may further include one or more sensors attached to the enclosure and connected to the control circuit to provide sensed data via the control circuit to the communication circuit of the UAV. The one or more sensors may include one or more of an infra-red camera, a visible camera, or a rangefinder.

An example of an apparatus includes an Unmanned Aerial Vehicle (UAV) that includes a communication circuit for communication with a remote control device, the UAV having a plurality of lugs extending from a surface; and a UAV Mechanical Release Device (MRD) attached to the UAV, the MRD comprising: an enclosure; a UAV-attachment mechanism including a plurality of captured pins that engage the plurality of lugs of the UAV; a payload latch mechanism to secure and release a drop-payload from the MRD, the payload latch mechanism including a circular gear coupled to a first arm and a second arm, the circular gear is rotatable to move the first and second arms in tandem between a closed position and an open position; a motor connected to the circular gear to move the first and second arms between the closed position and the open position; a control circuit configured to actuate the motor in response to a command received by the control circuit; and a cable that connects the control circuit to the UAV to provide power and communication from the UAV to the control circuit, the communication including commands received by the communication circuit of the UAV from the remote control device that are sent to the control circuit.

The apparatus may further include an additional payload latch mechanism to secure and release the drop-payload from the MRD, the additional payload latch mechanism including an additional circular gear coupled to a third arm and a fourth arm, the additional circular gear is rotatable to move the third and fourth arms in tandem between a closed position and an open position; and an additional motor connected to the additional circular gear to move the third and fourth arms between the closed position and the open position, the additional motor configured to actuate the additional motor in parallel with the motor in response to the command.

An example of an Unmanned Aerial Vehicle (UAV) drop-plate includes a frame that extends along a plane, the frame includes a plurality of frame members separated by a plurality of openings that extend through the frame; and a plurality of lugs attached to the frame, the plurality of lugs configured to extend along a direction perpendicular to the plane of the frame, each lug of the plurality of lugs configured to engage with a corresponding engagement feature of a UAV Mechanical Release Device (MRD).

The plurality of lugs may be rotatably attached to the frame and are configured to rotate into a folded configuration. In the folded configuration, each lug of the plurality of lugs may extend along the plane of the frame. In the folded configuration, each lug of the plurality of lugs may be located within a corresponding opening of the plurality of openings. In the folded configuration, each lug of the plurality of lugs may have a top surface that is substantially coplanar with a top surface of the frame and a bottom surface that is substantially coplanar with a bottom surface of the frame. The UAV drop-plate may further include a plurality of lug latches, each lug of the plurality of lugs having a corresponding lug latch to maintain the lug extending along the direction perpendicular to the plane of the frame. The UAV drop-plate may further include a plurality of buckles attached to the frame. The UAV drop-plate may further include a plurality of straps attached to the plurality of buckles. The frame and the plurality of lugs may be formed of glass-filled Nylon or polycarbonate.

An example of a method of attaching a payload to an Unmanned Aerial Vehicle (UAV) includes attaching the payload to a drop-plate that extends along a plane, the drop-plate having a plurality of drop-plate lugs extending perpendicular to the plane; laterally aligning the plurality of drop-plate lugs and corresponding openings of a Mechanical Release Device (MRD) of the UAV while a payload latch mechanism of the MRD is in an open position; subsequently, vertically aligning the plurality of drop-plate lugs and corresponding engagement features of the payload latch mechanism of the MRD while the payload latch mechanism of the MRD is in the open position; and subsequently, moving the payload latch mechanism of the MRD from the open position to a closed position such that the plurality of drop-plate lugs are engaged by the corresponding engagement features.

The method may further include rotating the plurality of drop-plate lugs from a folded configuration into an unfolded configuration in which the plurality of drop-plate lugs extend perpendicular to the plane prior to laterally aligning the plurality of drop-plate lugs and corresponding openings of the MRD. Attaching the payload to the drop-plate may include placing one or more straps that extend from the drop-plate around the payload. The drop-plate may be formed of frame members with openings between frame members and attaching the payload to the drop-plate may include extending one or more straps or chords through the openings and around frame members. The method may further include subsequently, flying the UAV to a destination; and dropping the drop-plate and payload from the UAV by moving the payload latch mechanism to the open position at the destination. Dropping the drop-plate and payload from the UAV may be in response to receiving a command from a remote control of the UAV.

An example of an Unmanned Aerial Vehicle (UAV) drop-plate includes a frame that extends along a plane, the frame includes a plurality of frame members separated by a plurality of openings that extend through the frame; and a plurality of lugs attached to the frame, each lug of the plurality of lugs is configurable between an unfolded configuration in which the lug extends perpendicular to the plane and a folded configuration in which the lug extends parallel to the plane within an opening, each lug of the plurality of lugs having a hole to engage a corresponding engagement feature of a UAV Mechanical Release Device (MRD).

The UAV drop-plate may further include a plurality of lug latches, each lug of the plurality of lugs having a corresponding lug latch to maintain the lug in the unfolded configuration. The plurality of lugs may consist of four lugs in a rectangular pattern. The UAV drop-plate may further include a plurality of buckles attached to the frame, each buckle holding a strap to attach a payload to the UAV drop-plate. The frame and the plurality of lugs may be formed of glass-filled Nylon or polycarbonate.

For purposes of this document, it should be noted that while various examples are given with specific combinations of components and specific configurations, in general, components used in one example may also be used in other examples and configurations may be combined.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. An Unmanned Aerial Vehicle (UAV) mechanical release device, comprising:
   a quick-release UAV-attachment mechanism to attach the UAV mechanical release device to a plurality of lugs of a UAV, the quick-release device includes one or more pins configured for insertion in corresponding holes in the plurality of lugs of the UAV;
   a payload latch mechanism to secure and release a drop-payload from the UAV mechanical release device; and
   a latch actuator connected to the payload latch mechanism, the latch actuator includes a motor to move the payload latch mechanism between a closed position and an open position to release the drop-payload and a manual switch located on a surface of the mechanical release device, the manual switch configured to manually actuate the motor to move the payload latch mechanism between the closed position and the open position.

2. The UAV mechanical release device of claim 1, further comprising a control circuit connected to the motor, the control circuit configured to actuate the motor in response to a command received by the control circuit.

3. The UAV mechanical release device of claim 2, further comprising a cable to connect the control circuit to the UAV, the cable configured to provide power and communication from the UAV to the control circuit.

4. The UAV mechanical release device of claim 1, wherein the payload latch mechanism further includes a manual engagement device to manually move the payload latch mechanism between the closed position and the open position.

5. The UAV mechanical release device of claim 1, further comprising:
   an additional payload latch mechanism configured to secure and release an additional drop- payload from the UAV mechanical release device independently of the drop-payload; and
   an additional latch actuator connected to the additional payload latch mechanism to move the additional payload latch mechanism between a closed position and an open position.

6. The UAV mechanical release device of claim 5, further comprising:
   a control circuit connected to the latch actuator and the additional latch actuator, the control circuit configured to actuate the latch actuator and the additional latch actuator in response to one or more commands received by the control circuit.

7. The UAV mechanical release device of claim 6, wherein the control circuit is configured to actuate the latch actuator and not the additional latch actuator in response to a first command, actuate the additional latch actuator and not the latch actuator in response to a second command, and actuate both the latch actuator and the additional latch actuator in tandem in response to a third command.

8. An Unmanned Aerial Vehicle (UAV) mechanical release device, comprising:
   an enclosure;

a UAV-attachment mechanism to attach the UAV mechanical release device to a UAV, the UAV- attachment mechanism including a plurality of captured pins to engage a corresponding plurality of lugs of the UAV, the plurality of captured pins extending through the enclosure, each captured pin having a limited range of lateral motion with respect to the enclosure from a closed position in which the captured pin extends through a corresponding hole in a lug of the UAV and an open position in which the captured pin does not extend through the hole in the lug of the UAV;

a payload latch mechanism to secure and release a drop-payload from the UAV mechanical release device, the payload latch mechanism including two or more engagement features including a first engagement feature at an end of a first arm and a second engagement feature at an end of a second arm, the two or more engagement features configured to engage two or more corresponding lugs of the drop-payload that are located in a predetermined arrangement and a circular gear coupled to the first and second arms, the circular gear is rotatable by the motor to move the first and second arms and first and second engagement features in tandem; and a motor connected to the payload latch mechanism to move the payload latch mechanism between a closed position in which the two or more engagement features engage the two or more corresponding lugs of the drop-payload and an open position in which the two or more engagement features are disengaged from the corresponding lugs of the drop-payload.

9. The UAV mechanical release device of claim 8, further comprising a manual engagement device to manually rotate the circular gear and move the payload latch mechanism between the closed position and the open position to manually secure and release the drop-payload.

10. The UAV mechanical release device of claim 8, further comprising a switch on an exterior surface of the enclosure, the switch configured to control the motor to move the payload latch mechanism between the closed position and the open position.

11. The UAV mechanical release device of claim 8, further comprising a locking pin to lock the payload latch mechanism in the closed position.

12. The UAV mechanical release device of claim 8, further comprising:
a control circuit configured to actuate the motor in response to a command received by the control circuit; and
a cable to connect the control circuit to the UAV, the cable configured to provide power from the UAV to the control circuit and to carry communication, including the command, between a communication circuit of the UAV and the control circuit.

13. The UAV mechanical release device of claim 12, further comprising one or more sensors attached to the enclosure and connected to the control circuit to provide sensed data via the control circuit to the communication circuit of the UAV.

14. The UAV mechanical release device of claim 8, wherein the plurality of captured pins are arranged in a predetermined pattern to engage a plurality of lugs of the UAV that extend from a mount plate attached to the UAV.

15. The UAV mechanical release device of claim 8, wherein the enclosure has a first plurality of openings in an upper surface for the plurality of lugs of the UAV and a second plurality of openings in a lower surface for the two or more lugs of the drop-payload.

16. An apparatus, comprising:
an Unmanned Aerial Vehicle (UAV) that includes a communication circuit for communication with a remote control device, the UAV having a plurality of lugs extending from a surface; and
a UAV Mechanical Release Device (MRD) attached to the UAV, the MRD including:
an enclosure;
a UAV-attachment mechanism including a plurality of captured pins that engage the plurality of lugs of the UAV;
a payload latch mechanism to secure and release a drop-payload from the MRD, the payload latch mechanism including a circular gear coupled to a first arm that has a first engagement feature and a second arm that has a second engagement feature, the circular gear is rotatable to move the first and second arms in tandem between a closed position in which the first and second engagement features engage corresponding lugs of the drop-payload and an open position in which the first and second engagement features do not engage the corresponding lugs of the drop-payload;
a motor connected to the circular gear to move the first and second arms between the closed position and the open position;
a control circuit configured to actuate the motor in response to a command received by the control circuit; and
a cable that connects the control circuit to the UAV to provide power and communication from the UAV to the control circuit, the communication including commands received by the communication circuit of the UAV from the remote control device that are sent to the control circuit.

17. The apparatus of claim 16 further comprising:
an additional payload latch mechanism to secure and release the drop-payload from the MRD, the additional payload latch mechanism including an additional circular gear coupled to a third arm and a fourth arm, the additional circular gear is rotatable to move the third and fourth arms in tandem between a closed position and an open position; and
an additional motor connected to the additional circular gear to move the third and fourth arms between the closed position and the open position, the additional motor configured to actuate the additional motor in parallel with the motor in response to the command.

* * * * *